(12) United States Patent
Tononishi

(10) Patent No.: US 10,096,868 B2
(45) Date of Patent: Oct. 9, 2018

(54) ENERGY STORAGE APPARATUS AND METHOD OF MANUFACTURING ENERGY STORAGE APPARATUS

(71) Applicant: GS Yuasa International Ltd., Kyoto-shi (JP)

(72) Inventor: Masamitsu Tononishi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 15/438,506

(22) Filed: Feb. 21, 2017

(65) Prior Publication Data

US 2017/0244139 A1    Aug. 24, 2017

(30) Foreign Application Priority Data

Feb. 23, 2016 (JP) ................. 2016-032535
Feb. 23, 2016 (JP) ................. 2016-032537

(51) Int. Cl.
| | |
|---|---|
| *H01M 10/052* | (2010.01) |
| *H01M 10/48* | (2006.01) |
| *H01G 9/00* | (2006.01) |
| *H01G 9/26* | (2006.01) |
| *H01G 9/28* | (2006.01) |
| *H01M 2/10* | (2006.01) |

(52) U.S. Cl.
CPC ........ *H01M 10/486* (2013.01); *H01G 9/0029* (2013.01); *H01G 9/26* (2013.01); *H01G 9/28* (2013.01); *H01M 2/1077* (2013.01); *H01M 10/482* (2013.01); *H01M 2220/20* (2013.01)

(58) Field of Classification Search
CPC ................. H01M 10/052; H01M 10/0525
See application file for complete search history.

(56) References Cited

U.S. PATENT DOCUMENTS

| | | | | |
|---|---|---|---|---|
| 2,939,901 | A | * | 6/1960 | Schultz ............... H01M 2/1077 429/100 |
| 2009/0053591 | A1 | | 2/2009 | Ikeda et al. |
| 2010/0136392 | A1 | * | 6/2010 | Pulliam .................. G01K 1/026 429/90 |
| 2010/0285340 | A1 | * | 11/2010 | Matsunaga .......... G01D 11/245 429/90 |
| 2012/0031517 | A1 | | 2/2012 | Yoshida |
| 2013/0273404 | A1 | | 10/2013 | Ochi et al. |
| 2013/0323552 | A1 | | 12/2013 | Kurita |
| 2014/0227570 | A1 | | 8/2014 | Hoshi et al. |

(Continued)

FOREIGN PATENT DOCUMENTS

| | | |
|---|---|---|
| JP | 2005-189080 A | 7/2005 |
| JP | 2009-048973 A | 3/2009 |

(Continued)

*Primary Examiner* — Olatunji Godo
(74) *Attorney, Agent, or Firm* — McGinn IP Law Group, PLLC

(57) ABSTRACT

An energy storage apparatus includes: a plurality of energy storage devices; a spacer unit having one or more spacers disposed between the energy storage devices or on sides of the energy storage devices; and a plurality of members disposed above the energy storage devices and the spacer unit (a bus bar frame, a heat shielding plate, a holder), wherein the spacer unit has a plurality of locking portions, the locking portions being configured to lock the members, respectively.

20 Claims, 27 Drawing Sheets

(56) References Cited

U.S. PATENT DOCUMENTS

2014/0335393 A1   11/2014   Wada et al.
2015/0380364 A1   12/2015   Watanabe et al.
2016/0218337 A1   7/2016   Morisaku et al.

FOREIGN PATENT DOCUMENTS

| JP | 2010-281787 A | 12/2010 |
| JP | 2013-084595 A | 5/2013 |
| JP | 2013-105545 A | 5/2013 |
| JP | 2013-140019 A | 7/2013 |
| JP | 2013-191422 A | 9/2013 |
| JP | 2013-251125 A | 12/2013 |
| JP | 2014-089912 A | 5/2014 |
| JP | 2015-053131 A | 3/2015 |
| JP | 2015-065055 A | 4/2015 |
| WO | WO 2012/057322 A1 | 5/2012 |
| WO | WO 2012/157464 A1 | 11/2012 |
| WO | WO 2013/084941 A1 | 6/2013 |
| WO | WO 2013/180158 A1 | 12/2013 |

\* cited by examiner

FIG. 23A
FIG. 23B
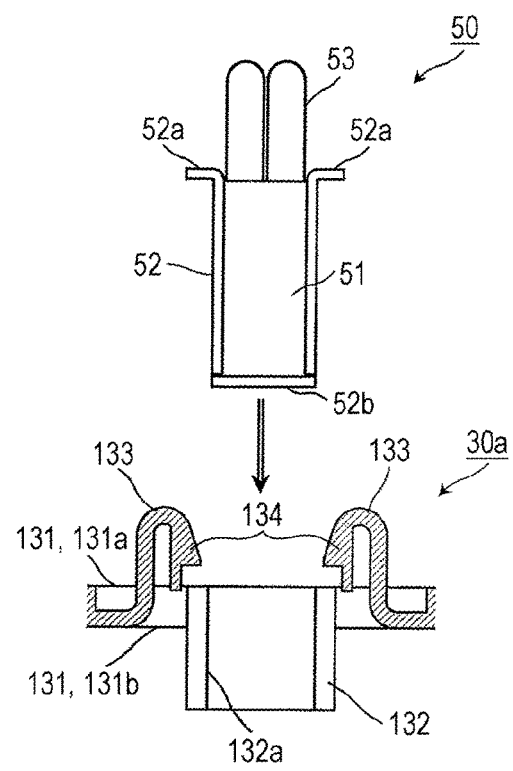
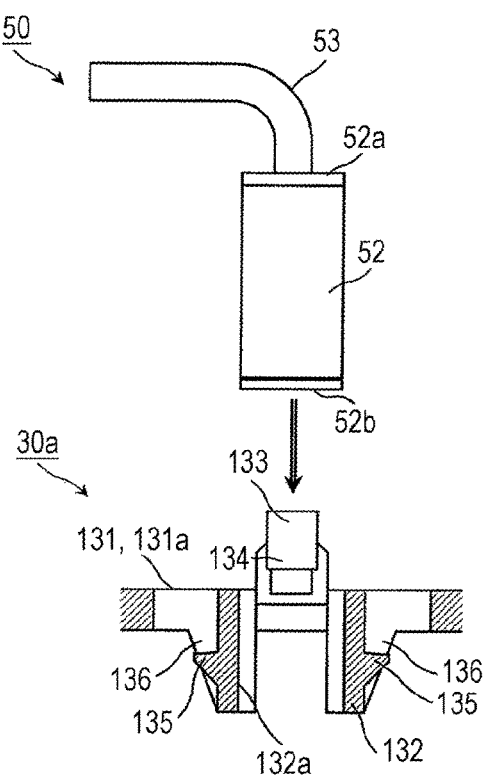
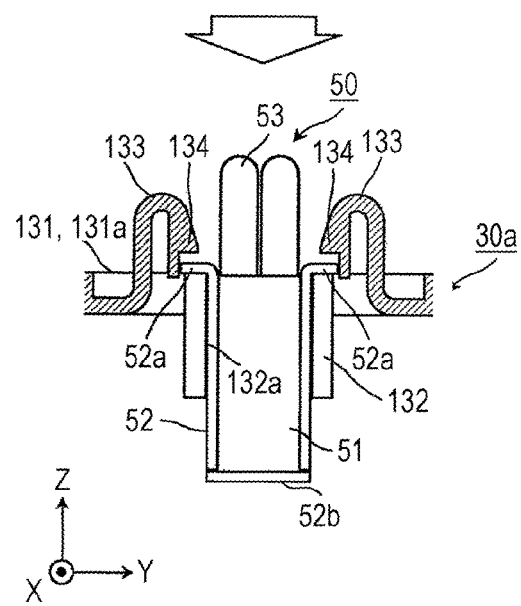
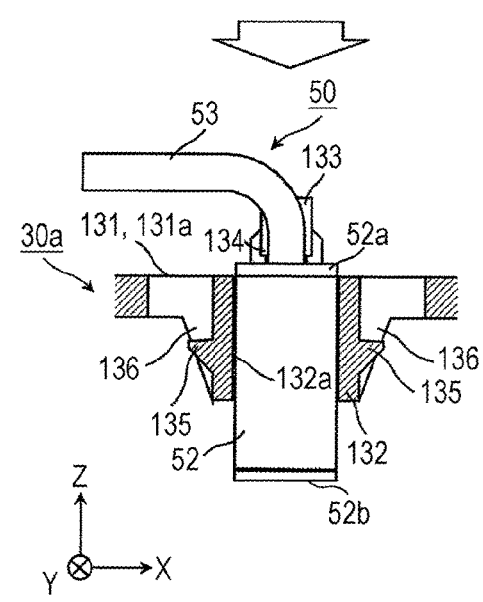

FIG. 24A
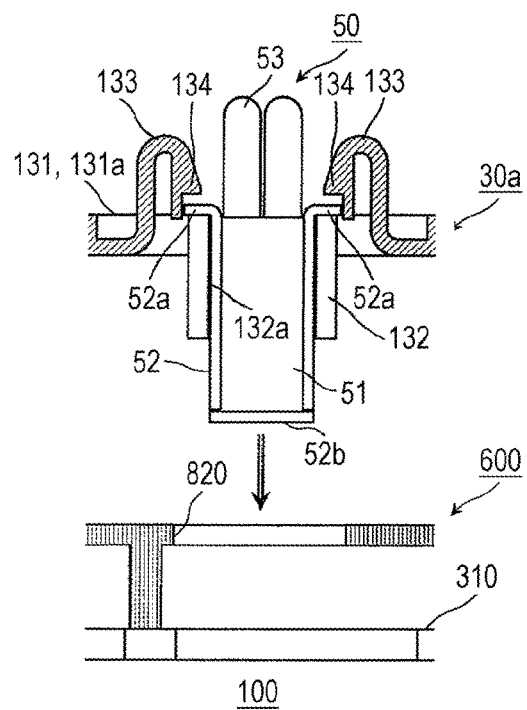
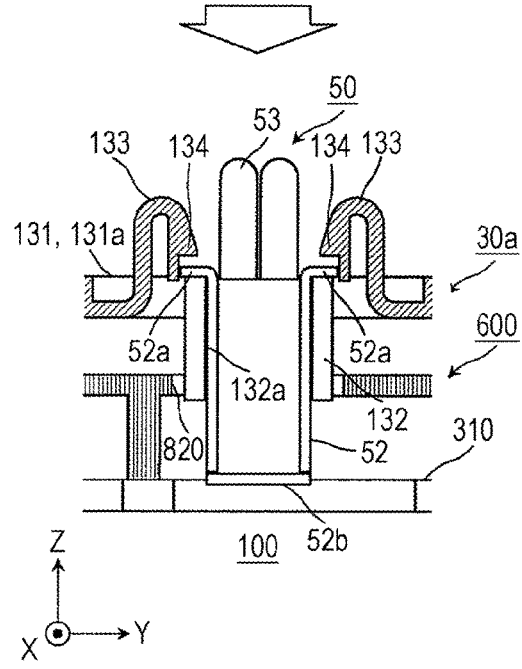
FIG. 24B
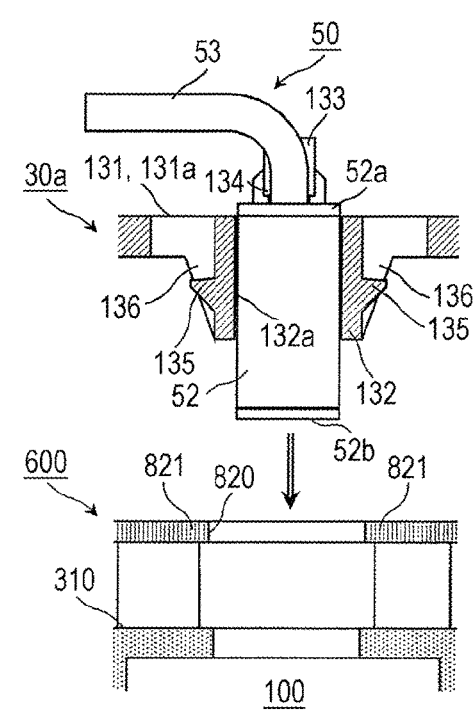
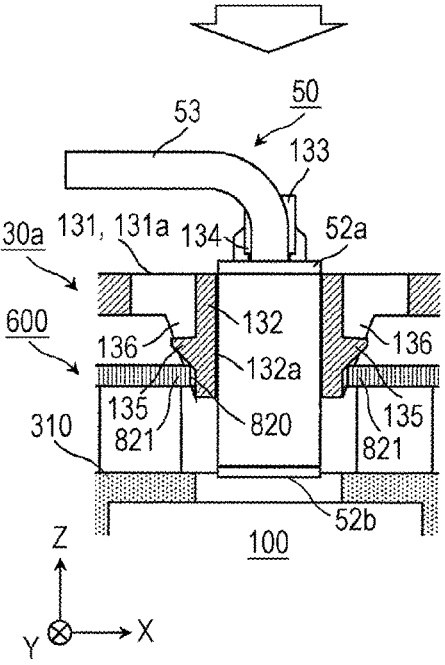

FIG. 25A
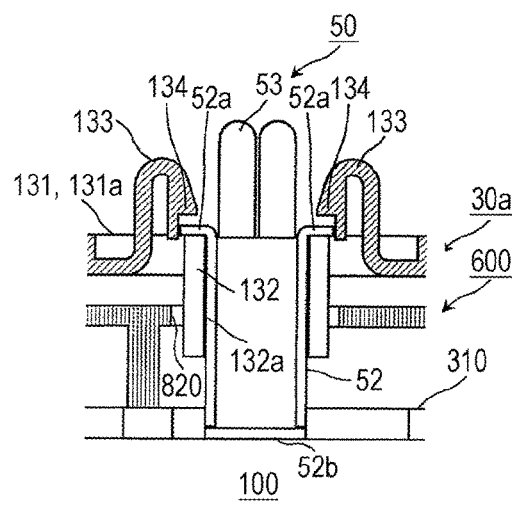
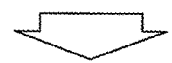
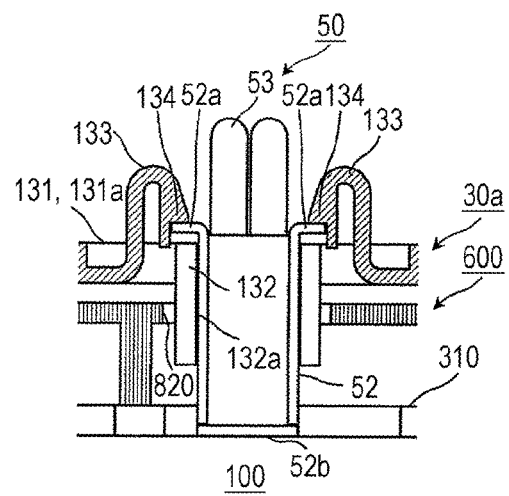
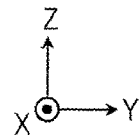
FIG. 25B
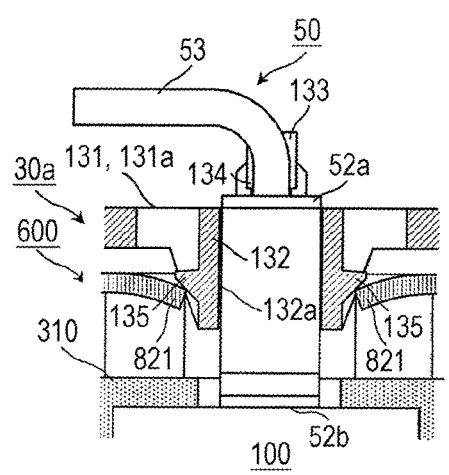
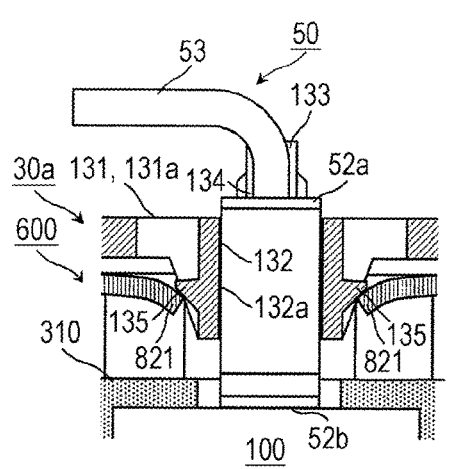
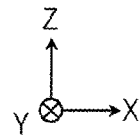

ENERGY STORAGE APPARATUS AND METHOD OF MANUFACTURING ENERGY STORAGE APPARATUS

CROSS-REFERENCE TO RELATED APPLICATIONS

This application claims the benefit of Japanese patent applications No. 2016-032535 filed on Feb. 23, 2016, and No. 2016-032537 filed on Feb. 23, 2016, which are incorporated by reference.

FIELD

The present invention relates to an energy storage apparatus which includes energy storage devices and an outer covering. The present invention also relates to an energy storage apparatus which includes energy storage devices and sensors mounted on the energy storage devices and a method of manufacturing the energy storage apparatus.

BACKGROUND

Conventionally, there has been known an energy storage apparatus which houses a plurality of energy storage devices. A large number of members are incorporated in an outer covering besides energy storage devices, and these members are individually locked (see JP 2013-191422 A, for example).

Conventionally, there has been a demand for enhancing assembling accuracy of respective members incorporated in the outer covering with respect to energy storage apparatuses.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It is an object of the present invention to provide an energy storage apparatus and a method of manufacturing an energy storage apparatus which can enhance assembling accuracy of respective members by making assembling references of a plurality of members uniform.

To achieve the above-mentioned object, according to an aspect of the present invention, there is provided an energy storage apparatus which includes: a plurality of energy storage devices; a spacer unit having one or more spacers disposed between the energy storage devices or on sides of the energy storage devices; and a plurality of members disposed above the energy storage devices and the spacer unit, wherein the spacer unit has a plurality of locking portions, the locking portions being configured to lock the members, respectively.

BRIEF DESCRIPTION OF DRAWINGS

The foregoing and other features of the present invention will become apparent from the following description and drawings of an illustrative embodiment of the invention in which:

FIGS. 23A-23B are cross-sectional views showing the first inserting step where the thermistor according to the second embodiment is inserted into the opening portion of the thermistor mounting portion of the holder.

FIGS. 24A-24B are cross-sectional views showing a second inserting step where the thermistor and the holder according to the second embodiment are inserted into a thermistor-use opening portion of a bus bar frame.

FIGS. 25A-25B are cross-sectional views showing a first engaging step where an upper engaging portion of the holder according to the second embodiment is locked to the thermistor.

DESCRIPTION OF EMBODIMENTS

Figure 1:
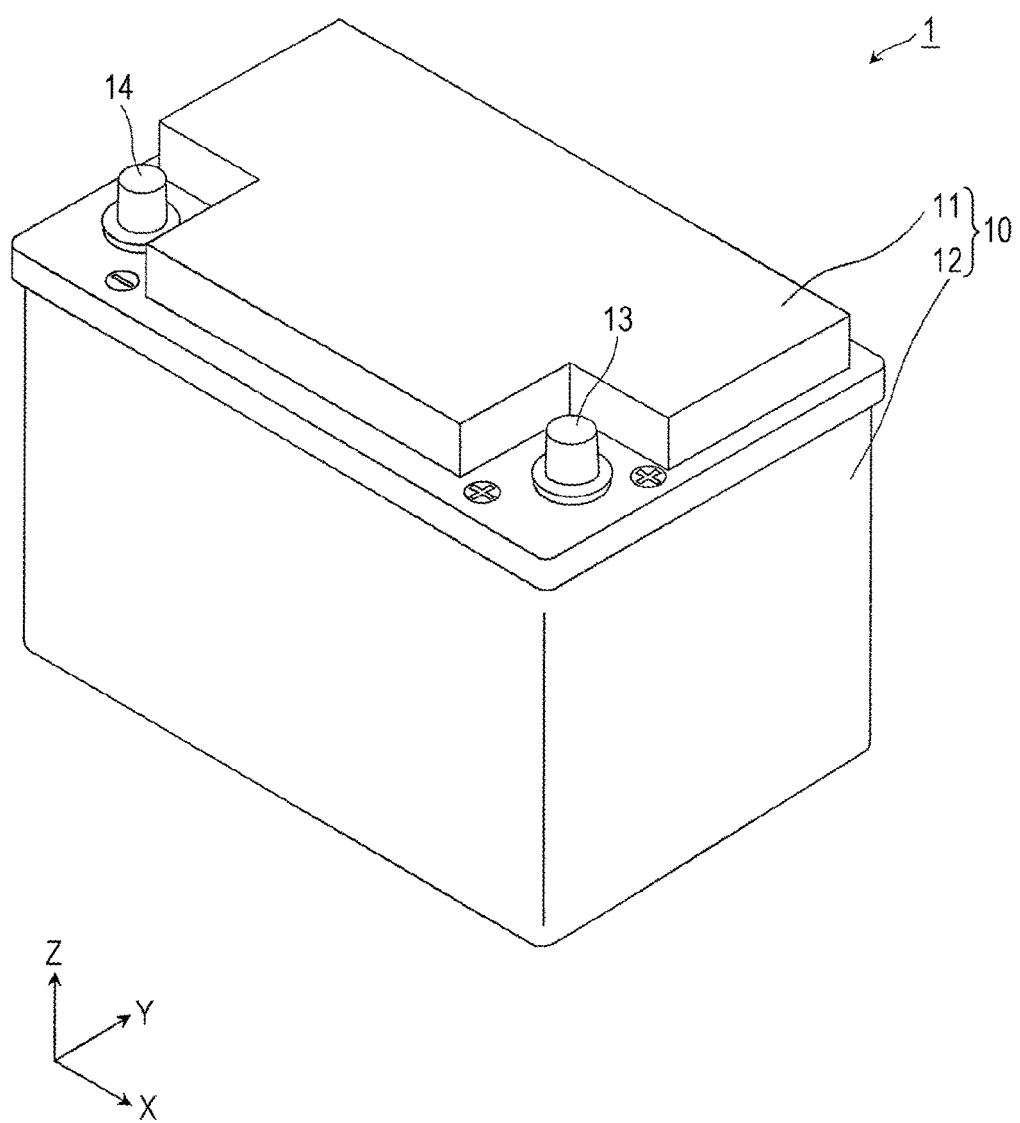
FIG. 1 is a perspective view showing an external appearance of an energy storage apparatus according to a first embodiment.

According to an aspect of the present invention, there is provided an energy storage apparatus which includes:
a plurality of energy storage devices;
a spacer unit having one or more spacers disposed between the energy storage devices or on sides of the energy storage devices; and
a plurality of members disposed above the energy storage devices and the spacer unit,
wherein the spacer unit has a plurality of locking portions, the locking portions being configured to lock the plurality of members, respectively.

With such a configuration, the spacer unit includes the plurality of locking portions which individually lock the plurality of members disposed above the spacer unit and hence, the plurality of members can be locked using the spacer unit as the reference. Accordingly, the assembling reference for the plurality of members can be made uniform and hence, assembling accuracy can be enhanced. Further, the plurality of members can be locked without using screws, an adhesive agent or the like and hence, a manufacturing cost can be suppressed.

Each of the spacers may have the locking portion which is formed of a plurality of locking portions.

With such a configuration, one spacer has the plurality of locking portions and hence, the respectively different members can be locked by the plurality of locking portions which one spacer has. Accordingly, a plurality of members can be assembled in a stable manner even when a single spacer is used as the reference for assembling.

The spacer unit may include a first spacer and a second spacer as the spacers,
the plurality of members may have a first member and a second member,
the first spacer may have the locking portion and may be configured to lock the first member by the locking portion, and
the second spacer may have the locking portion and may be configured to lock the second member by the locking portion.

With such a configuration, the first spacer locks the first member and the second spacer locks the second member and hence, one spacer is used for locking one member. Accordingly, compared to the case where a plurality of members are locked by one spacer, the respective members can be locked in a stable manner.

The locking portions may be configured to lock the plurality of members in a state where the locking portions support the plurality of members toward the spacer unit.

With such a configuration, the plurality of members are locked in a state where the locking portions support the plurality of members toward the spacer unit and hence, coming off of the plurality of members can be suppressed.

The plurality of members may be stacked in a vertical direction.

With such a configuration, the plurality of members are stacked in a vertical direction and hence, the plurality of members which are disposed in such arrangement can be also locked by the plurality of locking portions.

The plurality of locking portions may be disposed at a same height, and
each of the plurality of members may have a portion to be locked disposed at a locking position of the locking portion which corresponds to each of the plurality of members.

With such a configuration, in the plurality of members, the portion to be locked is disposed at locking positions of the locking portions which respectively correspond to the plurality of members and hence, even when the plurality of locking portions of the respective members have the same height, the respective locking portions can be locked to the portions to be locked of the respective members. Accordingly, the plurality of locking portions can be disposed at the same height.

The spacer unit may have the plurality of spacers, and
the spacers may have a same shape.

With such a configuration, the plurality of spacers have the same shape and hence, a manufacturing cost can be suppressed.

The energy storage apparatus may further include a sensor mounted on the energy storage device,
wherein among the plurality of members, one member may be a holder which holds the sensor, and
the sensor may be disposed in the vicinity of the locking portion which is configured to lock the holder.

With such a configuration, the sensor is disposed in the vicinity of the locking portion which locks the holder and hence, coming off of the holder which occurs at the time of mounting the sensor on the energy storage device can be suppressed by the locking portion.

The locking portion, which is configured to lock at least one member among the plurality of members, may be configured to lock a center portion of the member.

With such a configuration, the locking portion locks the center portions of the plurality of respective members and hence, coming off of the center portions of the members can be suppressed.

According to the energy storage apparatus of the present invention, the assembling references for the plurality of members can be made uniform and hence, assembling accuracy of the respective members can be enhanced.

Conventionally, there has been known an energy storage apparatus which includes energy storage devices where temperatures or the like of the energy storage devices can be measured by mounting sensors such as temperature sensors (for example, thermistors) on the energy storage devices (see JP 2013-251125 A, for example). In such an energy storage apparatus (energy storage module), a sensor (thermistor) which includes a spring member is mounted on the energy storage device (energy storage cell).

However, in the above-mentioned conventional energy storage apparatus, the sensor has the complicated structure including the spring member and hence, an operation of mounting the sensor on the energy storage device becomes cumbersome thus giving rise to a drawback that there is a possibility of lowering operability at the time of assembling the energy storage apparatus.

That is, in the above-mentioned conventional energy storage apparatus, the sensor includes the spring member and hence, there is a case where the spring member interferes with (is caught by) other portions, harnesses or the like at the time of mounting the sensor on the energy storage device. In this case, there is a possibility that an operation of mounting the sensor on the energy storage device becomes cumbersome and hence, operability at the time of assembling the energy storage apparatus is lowered or a cost is pushed up along with such lowering of operability.

It is another object of the present invention to provide an energy storage apparatus and a method of manufacturing the energy storage apparatus where a sensor can be easily mounted on an energy storage device without making the sensor have the complicated structure.

To achieve the above-mentioned object, according to another aspect of the present invention, there is provided an energy storage apparatus which includes:

an energy storage device;

a sensor mounted on the energy storage device; and a first member disposed in an opposedly facing manner with the energy storage device, the first member having: a first engaging portion disposed as to sandwich the sensor in cooperation with the energy storage device and configured to engage with the sensor; and a first biasing portion which is connected to the first engaging portion and is configured to bias the sensor toward the energy storage device.

Accordingly, the first member which is disposed in an opposedly facing manner with the energy storage device is disposed at the position where the first member sandwiches the sensor in cooperation with the energy storage device and engages with the sensor, and the first biasing portion which is connected to the first engaging portion and biases the sensor toward the energy storage device. With such a configuration, the first member engages with the sensor in such a manner that the first member sandwiches the sensor in cooperation with the energy storage device and the sensor is biased toward the energy storage device and hence, it is possible to easily mount the sensor on the energy storage device without making the sensor have the complicated structure.

The first engaging portion may be configured to engage with an upper surface of the sensor.

With such a configuration, the first engaging portion engages with the upper surface of the sensor and hence, the sensor can be formed into a simple shape.

The first member may further include a sensor inserting portion in which an opening portion for inserting the sensor is formed.

With such a configuration, the first member has the sensor inserting portion into which the sensor is inserted. Accordingly, with a simple operation that the sensor is inserted into the sensor inserting portion, the sensor can be easily mounted on the energy storage device.

The energy storage apparatus may further include a second member disposed between the energy storage device and the first member, wherein the sensor inserting portion may have a second engaging portion which is disposed between the energy storage device and the second member and is configured to engage with the second member.

With such a configuration, the sensor inserting portion includes the second engaging portion which engages with the second member between the energy storage device and the second member and hence, when the second engaging portion engages with the second member, it is possible to suppress coming off of the first member. Particularly, since the sensor inserting portion has the second engaging portion, the second engaging portion is disposed in the vicinity of the sensor and hence, it is possible to effectively suppress coming off of the first member brought about by the sensor.

The second engaging portion may be a projecting portion which projects from a side surface of the sensor inserting portion.

With such a configuration, the second engaging portion forms the projecting portion projecting from the side surface of the sensor inserting portion and hence, it is possible to easily make the second engaging portion engage with the second member.

The second member may have a second biasing portion which is configured to engage with the second engaging portion, and is configured to bias the second engaging portion toward the energy storage device.

With such a configuration, by biasing the second engaging portion toward the energy storage device by the second biasing portion which the second member has, it is possible to suppress coming off of the first member.

The second member may have two gaps communicating with the opening portion into which the sensor is inserted at a position where the second member sandwiches an engaging portion with the second engaging portion.

With such a configuration, the second member has two gaps at positions which sandwich the engaging portion of the second member with the second engaging portion. Accordingly, at the time of mounting the first member on the second member, the engaging portion of the second member can be elastically deformed so that it is possible to make the second member engage with the second engaging portion.

According to still another aspect of the present invention, there may be provided an energy storage apparatus which includes:

an energy storage device;

a sensor mounted on the energy storage device;

a first member disposed in an opposedly facing manner with the energy storage device; and a second member disposed between the energy storage device and the first member, wherein the sensor is oriented in a direction which intersects with the first member, and the first member includes:

a first engaging portion disposed as to sandwich the sensor in cooperation with the energy storage device, the first engaging portion being configured to engage with the sensor; and a first biasing portion which is connected to the first engaging portion and is configured to bias the sensor toward the energy storage device, and the first engaging portion is configured to engage with an upper surface of the sensor.

With such a configuration, in the energy storage apparatus, the first member which is disposed in an opposedly facing manner with the energy storage device has the first engaging portion which is disposed at the position where the first engaging portion sandwiches the sensor in cooperation with the energy storage device and engages with the sensor, and the first biasing portion which is connected to the first engaging portion and biases the sensor toward the energy storage device. Further, the sensor is disposed in the direction which intersects with the first member, and the first engaging portion engages with the upper surface of the sensor. With such a configuration, the first member engages with the upper surface of the sensor in such a manner that the first member sandwiches the sensor in cooperation with the energy storage device, and the sensor is biased toward the energy storage device. Accordingly, it is possible to easily mount the sensor on the energy storage device without making the sensor have the complicated structure.

To achieve the above-mentioned object, according to still further aspect of the present invention, there is provided a method of manufacturing an energy storage apparatus which includes an energy storage device and a sensor mounted on the energy storage device, wherein a first engaging portion of a first member which is disposed in an opposedly facing manner with the energy storage device, the first engaging portion being disposed at a position where the first engaging portion sandwiches the sensor in cooperation with the energy storage device and being made to engage with the sensor, and the sensor is biased toward the energy storage device by a first biasing portion of the first member connected to the first engaging portion.

With such a configuration, in the method of manufacturing an energy storage apparatus, the first engaging portion of the first member which is disposed in an opposedly facing manner with the energy storage device is disposed at the position where the first engaging portion sandwiches the sensor in cooperation with the energy storage device so that the first engaging portion engages with the sensor, and the sensor is biased toward the energy storage device by the first biasing portion of the first member. Accordingly, the first member engages with the sensor in such a manner that the first member sandwiches the sensor in cooperation with the energy storage device and the sensor is biased toward the energy storage device and hence, it is possible to easily mount the sensor on the energy storage device without making the sensor have the complicated structure.

The present invention can be realized not only in the form of an energy storage apparatus but also in the form of a first member and a second member which the energy storage apparatus includes.

According to the energy storage apparatus of the present invention, it is possible to easily mount the sensor on the energy storage device without making the sensor have the complicated structure.

[First Embodiment]

Hereinafter, the energy storage apparatus according to a first embodiment of the present invention is described with reference to drawings. The first embodiment described hereinafter is one preferred specific example of the present invention. In the first embodiment described hereinafter, numerical values, shapes, materials, constitutional elements, the arrangement positions and connection states of the constitutional elements and the like are merely examples, and these are not intended to be used for limiting the present invention. Further, out of the constitutional elements in the first embodiment described hereinafter, the constitutional elements which are not described in independent claims describing an uppermost concept are described as arbitrary constitutional elements. In the respective drawings, the respective constitutional elements are not described strictly accurately in size or the like.

First, the configuration of an energy storage apparatus 1 is described.

Figure 2:
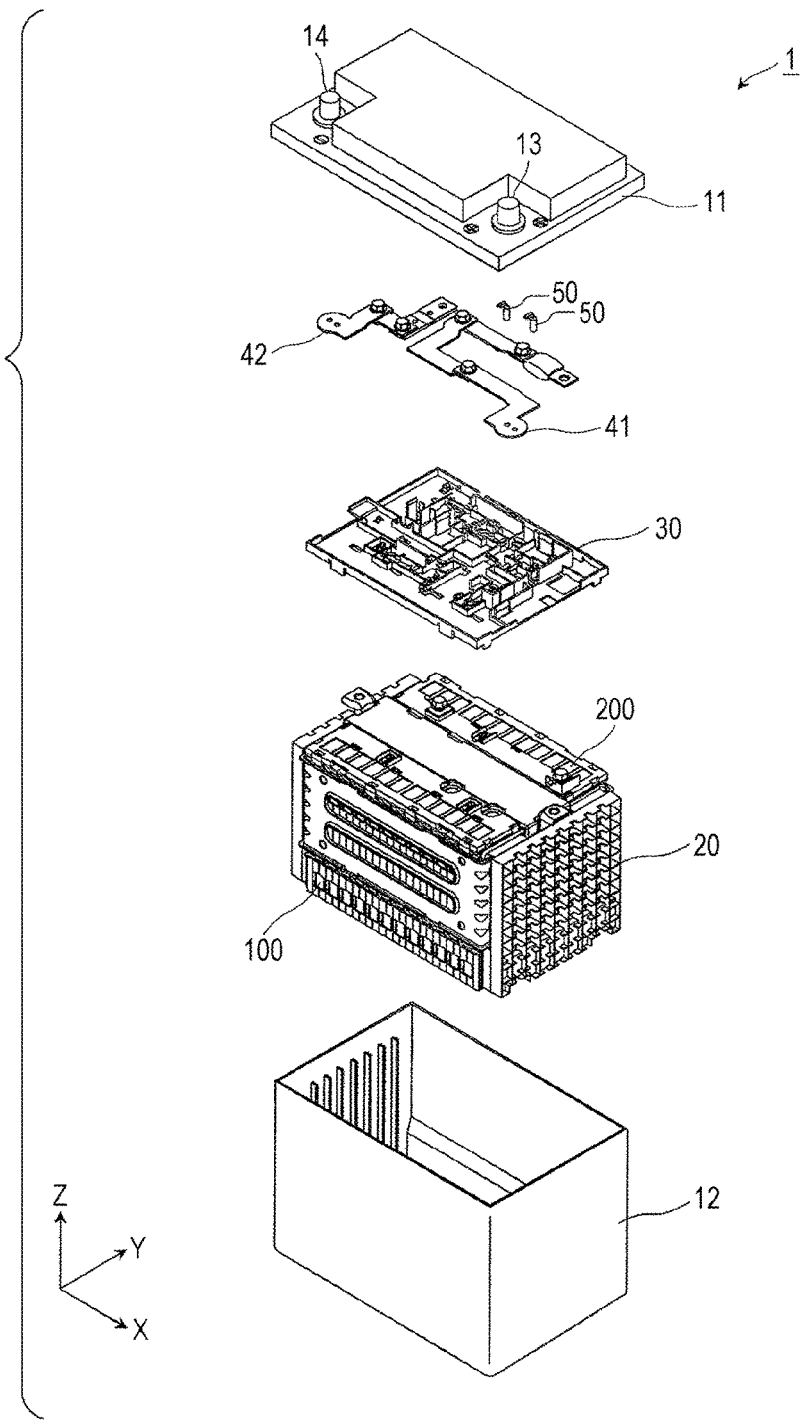
FIG. 2 is an exploded perspective view showing respective constitutional elements of the energy storage apparatus according to the first embodiment in a disassembled state.

FIG. 1 is a perspective view showing an external appearance of the energy storage apparatus 1 according to a first embodiment of the present invention. FIG. 2 is an exploded perspective view showing respective constitutional elements of the energy storage apparatus 1 according to the first embodiment of the present invention in a disassembled state.

In these drawings, the Z axis direction is indicated as the vertical direction, and the description is made hereinafter using the Z axis direction as the vertical direction. However, there may be also a case where the Z axis direction is not the vertical direction depending on a mode of use and hence, the Z axis direction is not limited to the vertical direction. The same goes for drawings which are referenced hereinafter.

The energy storage apparatus 1 is an apparatus which can charge electricity from the outside of the energy storage apparatus 1 therein or can discharge electricity to the outside of the energy storage apparatus 1. For example, the energy storage apparatus 1 is a battery module used for power storage application, power source application or the like. Particularly, in this embodiment, it is preferable that the energy storage apparatus 1 be used as an engine starting battery for a mobile body such as an automobile, a motorcycle, a water craft, a snowmobile, an agricultural machine or a construction machine, for example. In this case, to facilitate the maintenance, the exchange operation and the like, for example, the energy storage apparatus 1 is mounted in an exposed state at a place which an operator can easily access such as the inside of a hood, the inside of a trunk or the like of the mobile body. Further, the energy storage apparatus 1 can supply electricity to an external load singly (in a single form) or can be charged from an external power source singly (in a single form). That is, although there exists the configuration where a plurality of battery modules (energy storage apparatuses) are connected to each other and are housed in a case thus forming a battery pack as a driving power source for an electric vehicle, a plug-in hybrid electric vehicle and the like, the energy storage apparatus 1 of this embodiment has the configuration different from such a configuration. Further, a battery pack may be configured by electrically connecting the plurality of energy storage apparatuses 1 to each other corresponding to an external load or an external power source.

As shown in FIG. 1 and FIG. 2, the energy storage apparatus 1 includes an outer covering 10 formed of a first outer covering 11 and a second outer covering 12. The energy storage apparatus 1 also includes an energy storage unit 20, a holder 30, bus bars 41, 42, thermistors 50 and the like which are housed in the outer covering 10.

The outer covering 10 is a container (module case) having a rectangular shape (box shape) which forms an outer covering of the energy storage apparatus 1. The outer covering 10 is partially communicable with the outside of the energy storage apparatus 1, and is used in a substantially sealed state (semi-sealed state). That is, the outer covering 10 is disposed outside the energy storage unit 20, the holder 30, the bus bars 41, 42 and the thermistors 50, and allows the energy storage unit 20 and the like to be disposed at predetermined positions in the outer covering 10 thus protecting the energy storage unit 20 and the like from an impact or the like. For example, the outer covering 10 is made of an insulating resin material such as polycarbonate (PC), polypropylene (PP), polyethylene (PE), a polyphenylene sulfide resin (PPS), polybutylene terephthalate (PBT) or an ABS resin. Accordingly, the outer covering 10 prevents the energy storage unit 20 and the like from coming into contact with a metal member or the like disposed outside the outer covering 10.

In this embodiment, the outer covering 10 includes: the first outer covering 11 forming a lid body of the outer covering 10; and the second outer covering 12 forming a body of the outer covering 10. The first outer covering 11 is a cover member having a flat rectangular shape which closes an opening of the second outer covering 12. A positive electrode external terminal 13 and a negative electrode external terminal 14 are mounted on the first outer covering 11. In the inside of the first outer covering 11, electric equipment such as a printed circuit board (not shown in the drawing) and a relay (not shown in the drawing), and wirings (not shown in the drawing) for connecting such electric equipment and the energy storage devices 100 in the energy storage unit 20 with each other are disposed.

On the printed circuit board, a control circuit for acquiring, monitoring and controlling various kinds of information such as a charging state and a discharging state of the energy storage devices 100, a voltage value, a current value, and a temperature of the energy storage device 100 is mounted, and the control circuit controls ON and OFF of the relays and performs communication with other equipment.

The energy storage apparatus 1 charges electricity from the outside therein or discharges electricity to the outside through the positive electrode external terminal 13 and the negative electrode external terminal 14 based on a control by the control circuit.

The second outer covering 12 is a bottomed rectangular cylindrical housing having the opening, and houses the energy storage unit 20, the holder 30, the bus bars 41, 42, the thermistors 50 and the like.

The first outer covering 11 and the second outer covering 12 may be made of the same material, or may be made of different materials.

The energy storage unit 20 includes a plurality of energy storage devices 100 (twelve energy storage devices 100 in this embodiment) and a plurality of bus bars 200, and is electrically connected to the positive electrode external terminal 13 and the negative electrode external terminal 14 formed on the first outer covering 11. That is, a positive electrode terminal of any one of the plurality of energy storage devices 100 is electrically connected to the positive electrode external terminal 13 through the bus bars 200. A negative electrode terminal of any one of the plurality of energy storage devices 100 is electrically connected to the negative electrode external terminal 14 through the bus bars 200.

The energy storage unit 20 is disposed in the inside of the second outer covering 12 such that the plurality of energy storage devices 100 are arranged in a row in the X axis direction in a state where each energy storage device 100 is mounted vertically. The energy storage unit 20 is housed in the outer covering 10 while being covered by the first outer covering 11 from above. The detailed configuration of the energy storage unit 20 is described later.

The holder 30 is a member which can hold the bus bars 41, 42, provides insulation between the bus bars 41, 42 and other members, and regulates the positions of the bus bars 41, 42. Particularly, the holder 30 positions the bus bars 41, 42 with respect to the bus bars 200 disposed in the inside of the energy storage unit 20, the positive electrode external terminal 13 and the negative electrode external terminal 14.

To be more specific, the holder 30 is mounted on an upper side (a plus side in the Z axis direction) of the energy storage unit 20 and is positioned with respect to the energy storage unit 20. The bus bars 41, 42 are mounted on the holder 30 and are positioned with respect to the holder 30. The first outer covering 11 is disposed on the holder 30. With such a configuration, the bus bars 41, 42 are positioned with respect to the bus bars 200 disposed in the inside of the energy storage unit 20 and the positive electrode external terminal 13 and the negative electrode external terminal 14 mounted on the first outer covering 11.

The holder 30 also has a function of holding the thermistors 50. That is, the thermistors 50 are mounted on the holder 30 so that the holder 30 positions the thermistors 50 with respect to the energy storage devices 100. Further, the holder 30 fixes the thermistors 50 in a state where the thermistors 50 are pressed to the energy storage devices 100.

The holder 30 is made of an insulating resin material such as PC, PP, PE, PPS, PBT or an ABS resin, for example. However, the holder 30 may be made of any material provided that the holder 30 is made of a material having insulating property.

The bus bars 41, 42 electrically connect the bus bars 200 disposed in the energy storage unit 20 and the positive electrode external terminal 13 and the negative electrode external terminal 14 mounted on the first outer covering 11 to each other. That is, the bus bar 41 is a conductive member which electrically connects the bus bar 200 disposed on one end in the energy storage unit 20 and the positive electrode external terminal 13 to each other. The bus bar 42 is a conductive member which electrically connects the bus bar 200 disposed on the other end in the energy storage unit 20 and the negative electrode external terminal 14 to each other.

The bus bars 41, 42 are conductive members and are made of copper, for example. However, materials for forming the bus bars 41, 42 are not particularly limited. The bus bars 41, 42 may be made of the same material or different materials.

The thermistors 50 are temperature sensors mounted on the energy storage devices 100. That is, the thermistors 50 are mounted on the energy storage devices 100 and measure temperatures of the energy storage devices 100. In this embodiment, two thermistors 50 are mounted on two energy storage devices 100.

Next, the configuration of the energy storage unit 20 is described in detail.

Figure 3:
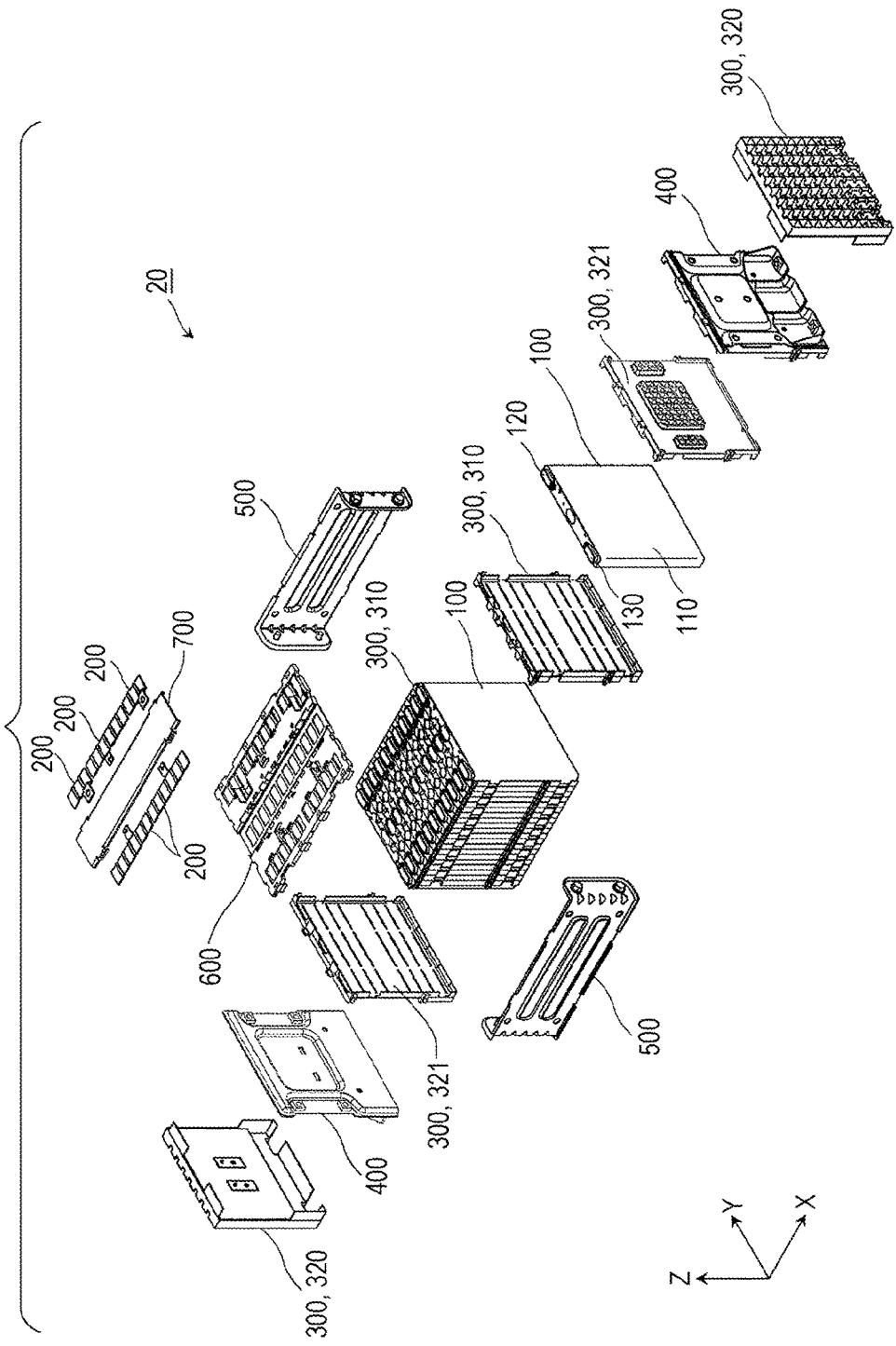
FIG. 3 is an exploded perspective view showing respective constitutional elements of an energy storage unit according to the first embodiment in a disassembled state.

FIG. 3 is an exploded perspective view showing respective constitutional elements of the energy storage unit 20 according to the first embodiment of the present invention in a disassembled state.

As shown in FIG. 3, the energy storage unit 20 includes: the plurality of energy storage devices 100; the plurality of bus bars 200; a spacer unit 300 (a plurality of spacers 310, a pair of first sub spacers 320, a pair of second sub spacers 321); a pair of sandwiching members 400; a plurality of binding members 500; a bus bar frame 600; and a heat shielding plate 700.

The energy storage device 100 is a secondary battery (single battery) which can charge or discharge electricity. To be more specific, the energy storage device 100 is a non-aqueous electrolyte secondary battery such as a lithium ion secondary battery. The energy storage device 100 has a flat rectangular shape, and is disposed adjacently to the spacer 310. That is, the plurality of energy storage devices 100 and the plurality of spacers 310 are arranged in a row in the X axis direction such that the energy storage device 100 and the spacer 310 are alternately arranged. In this embodiment, twelve energy storage devices 100 and eleven spacers 310 are arranged such that the energy storage device 100 and the spacer 310 are arranged alternately and adjacently to each other. The energy storage device 100 is not limited to a nonaqueous electrolyte secondary battery, and may be a secondary battery other than a nonaqueous electrolyte secondary battery, or may be a capacitor.

As shown in FIG. 3, the energy storage device 100 includes a container 110, a positive electrode terminal 120 and a negative electrode terminal 130. An electrode assembly (power generating element), current collectors (a positive electrode current collector and a negative electrode current collector) and the like are disposed in the inside of the container 110, and a liquid such as an electrolyte solution (nonaqueous electrolyte) is sealed in the container 110. However, the detailed description of such a configuration is omitted.

The container 110 is formed of: a bottomed housing body made of metal and having a rectangular cylindrical shape; and a metal-made lid portion which closes an opening of the housing body. The container 110 is configured such that the inside of the container 110 can be hermetically sealed by joining the lid portion and the housing body to each other by welding or the like after the electrode assembly and the like are housed in the inside of the container 110. As described above, the container 110 is a rectangular parallelepiped container having a lid portion disposed on a plus side in the Z axis direction in the drawing, long side surfaces disposed on side surfaces of the container on both sides in the X axis direction, short side surfaces disposed on side surfaces of the container on both sides in the Y axis direction, and a bottom surface disposed on a minus side in the Z axis direction. That is, the X axis direction is a lateral direction of the energy storage device 100, and the Y axis direction is a longitudinal direction of the energy storage device 100. Hereinafter, there may be a case where the X axis direction is referred to as the lateral direction, and the Y axis direction is referred to as the longitudinal direction. Although a material for forming the container 110 is not particularly limited, it is preferable that the container 110 be made of weldable metal such as stainless steel, aluminum or an aluminum alloy, for example.

The positive electrode terminal 120 is an electrode terminal electrically connected to a positive electrode of an electrode assembly through a positive electrode current collector. The negative electrode terminal 130 is an electrode terminal electrically connected to a negative electrode of an electrode assembly through a negative electrode current collector. Both the positive electrode terminal 120 and the negative electrode terminal 130 are mounted on the lid portion of the container 110. That is, the positive electrode terminal 120 and the negative electrode terminal 130 are metal-made electrode terminals through which electricity stored in the electrode assembly is discharged to a space outside the energy storage device 100, and through which electricity is introduced into a space inside the energy storage device 100 for storing electricity in the electrode assembly. In this embodiment, the energy storage devices 100 are disposed in a state where the positive electrode terminals 120 and the negative electrode terminals 130 are directed upward.

The bus bars 200 are bus bars electrically connected to the plurality of respective energy storage devices 100 housed in the energy storage unit 20. That is, the bus bars 200 are conductive members electrically connected to the respective electrode terminals which the plurality of energy storage devices 100 include, and the bus bars 200 electrically connect respective electrode terminals which the plurality of energy storage devices 100 have respectively to each other. To be more specific, the bus bars 200 are disposed on surfaces of the respective electrode terminals which the plurality of respective energy storage devices 100 include, and are connected (joined) to the electrode terminals.

In this embodiment, five bus bars 200 are disposed on the energy storage devices 100. Twelve energy storage devices 100 are disposed such that four sets of energy storage devices 100 each of which is formed of three energy storage devices 100 connected parallel to each other are connected in series by five bus bars 200. The bus bars 200 disposed on end portions are connected to the bus bars 41, 42 described above so that the bus bars 200 are electrically connected to the positive electrode external terminal 13 and the negative electrode external terminal 14.

The bus bars 200 are conductive members made of aluminum, for example. However, a material for forming the bus bars 200 is not particularly limited. All bus bars 200 may be made of the same material, or some bus bars 200 may be made of different materials.

The spacer unit 300 is formed of the plurality of spacers 310, the pair of first sub spacers 320 and the pair of second sub spacers 321. These spacers 310, 320, 321 are made of an insulating resin such as PC, PP, PE, PPS, PBT or an ABS resin, for example. The spacers 310, the first sub spacers 320 and the second sub spacers 321 may be made of any material provided that the spacers 310, the first sub spacers 320 and the second sub spacers 321 are made of a material having insulating property. All of the spacers 310, the first sub spacers 320 and the second sub spacers 321 may be made of the same material, or any one of the spacers 310, the first sub spacers 320 and the second sub spacers 321 may be made of a material different from a material for forming other spacers.

The spacer 310 is a plate-like member which is disposed on a side (the plus side or the minus side in the X axis direction) of the energy storage device 100, and provides insulation between the energy storage device 100 and other members. That is, the spacer 310 is arranged between two energy storage devices 100 disposed adjacently to each other, and provides insulation between two energy storage devices 100. In this embodiment, twelve energy storage devices 100 and eleven spacers 310 are arranged in a row such that the spacer 310 is disposed between two energy storage devices 100 disposed adjacently to each other.

The spacer 310 is formed such that the spacer 310 covers approximately half of a front surface side or a back surface side of the energy storage device 100 (an approximately half of the front surface side or the back surface side of the energy storage device 100 when the energy storage device 100 is divided in two in the X axis direction). That is, a recessed portion is formed on both surfaces (both surfaces in the X axis direction) of the spacer 310 on the front surface side and the back surface side respectively, and an approximately half of the energy storage device 100 is inserted into each recessed portion. With such a configuration, the spacers 310 disposed on sides of the energy storage device 100 cover the most part of the energy storage device 100. Accordingly, insulating property between the energy storage devices 100 and other conductive members can be enhanced by the spacers 310.

The first sub spacer 320 is a plate-like member which is disposed between the sandwiching member 400 described later and the outer covering 10, and provides insulation between the sandwiching member 400 and the outer covering 10. The first sub spacer 320 also has a function as a buffer member which protects the energy storage unit 20 when an impact is applied to the outer covering 10 from the outside or the like. That is, the pair of first sub spacers 320 is disposed between the pair of sandwiching members 400 and the outer covering 10 such that the pair of first sub spacers 320 sandwiches the pair of sandwiching members 400 from both sides. The pair of first sub spacers 320 insulates the energy storage devices 100 and the like disposed in the energy storage unit 20, and also protects the energy storage devices 100 and the like from an impact from the outside.

The second sub spacer 321 is a plate-like member which is disposed on the outermost side in the X axis direction of the unit formed of the plurality of energy storage devices 100, and provides insulation between the unit formed of the plurality of energy storage devices 100 and other members. To be more specific, outer side surfaces of the pair of energy storage devices 100 disposed on the outermost side out of the plurality of energy storage devices 100 are not covered by the spacers 310 and hence, the pair of second sub spacers 321 is provided for covering the outer side surfaces of the energy storage devices 100. With such a configuration, each of the pair of second sub spacers 321 is disposed between the unit formed of the plurality of energy storage devices 100 and the sandwiching member 400 thus providing insulation between the unit formed of the plurality of energy storage devices 100 and the sandwiching member 400.

The sandwiching members 400 and the binding members 500 are members which press the energy storage devices 100 from the outside in the stacking direction of the electrode assembly of the energy storage device 100. That is, the sandwiching members 400 and the binding members 500 sandwich the plurality of energy storage devices 100 from both sides in the stacking direction thus pressing each energy storage device 100 included in the plurality of respective energy storage devices 100 from both sides. The stacking direction of the electrode assembly of the energy storage devices 100 means the direction that positive electrodes, negative electrodes and separators of the electrode assembly are stacked, and is equal to the direction (X axis direction) that the plurality of energy storage devices 100 are arranged in a row. That is, the plurality of energy storage devices 100 are arranged in a row in the stacking direction.

To be more specific, the sandwiching members 400 are flat plate-like members (end plates) disposed on both sides of the unit formed of the plurality of energy storage devices 100 in the X axis direction respectively. The sandwiching members 400 hold the plurality of energy storage devices 100, the plurality of spacers 310 and the pair of second sub spacers 321 by sandwiching the plurality of energy storage devices 100, the plurality of spacers 310 and the pair of second sub spacers 321 from both sides in the arrangement direction (X axis direction) of the plurality of energy storage devices 100, the plurality of spacers 310 and the pair of second sub spacers 321. The sandwiching member 400 is formed of a metal (conductive) material such as steel or stainless steel, for example, from a viewpoint of strength or the like of the sandwiching members 400. However, a material for forming the sandwiching member 400 is not limited to a metal material, and may be made of an insulating material having high strength, for example.

The binding members 500 are elongated flat-plate-like members (binding bars) each of which has both ends thereof mounted on the sandwiching members 400, and bind the plurality of energy storage devices 100 to each other. That is, the binding members 500 are disposed so as to straddle over the plurality of energy storage devices 100, the plurality of spacers 310 and the pair of second sub spacers 321 thus applying a binding force in the arrangement direction (X axis direction) of these members to the plurality of energy storage devices 100, the plurality of spacers 310 and the pair of second sub spacers 321.

In this embodiment, two binding members 500 are disposed on both sides (both sides in the Y axis direction) of the unit formed of the plurality of energy storage devices 100, and two binding members 500 bind the plurality of energy storage devices 100 to each other by sandwiching the plurality of energy storage devices 100 from both sides. In the same manner as the sandwiching members 400, the binding members 500 are preferably made of a metal material such as steel or stainless steel, for example. However, the binding members 500 may be made of a material other than metal.

The bus bar frame 600 is a member which can provide insulation between the bus bars 200 and other members, and can regulate the positions of the bus bars 200. Particularly, the bus bar frame 600 positions the bus bars 200 with respect to the plurality of energy storage devices 100 disposed in the energy storage unit 20.

To be more specific, the bus bar frame 600 is placed on an upper side (a plus side in the Z axis direction) of the plurality of energy storage devices 100, and is positioned with respect to the plurality of energy storage devices 100. The bus bars 200 are placed on the bus bar frame 600 and are positioned. With such a configuration, the bus bars 200 are positioned with respect to the plurality of energy storage devices 100, and the bus bars 200 are bonded to electrode terminals which the plurality of respective energy storage devices 100 include. The bus bar frame 600 is made of an insulating resin material such as PC, PP, PE, PPS, PBT or an ABS resin, for example. However, the bus bar frame 600 may be made of any material provided that the bus bar frame 600 is made of a material having insulating property.

The heat shielding plate 700 is a plate-like member having heat insulating property which is disposed in a gas discharge flow passage formed in safety valves of the energy storage devices 100. To be more specific, the heat shielding plate 700 is disposed above the bus bar frame 600 such that the heat shielding plate 700 is positioned above the safety valves of the energy storage devices 100. That is, when an abnormal state occurs such as a case where a gas is discharged from the safety valve of the energy storage device 100, the heat shielding plate 700 protects electric equipment such as a printed circuit board disposed above the energy storage unit 20 from heat of the gas. In this embodiment, the heat shielding plate 700 is made of a metal material having low thermal conductivity such as stainless steel. However, a material for forming the heat shielding plate 700 is not limited to such a metal material, and any material having high heat resistance and low thermal conductivity can be used. For example, the heat shielding plate 700 may be made of a resin such as PPS or PBT reinforced with glass fibers, ceramic or the like.

In the energy storage apparatus 1 having the above-mentioned configuration, the plurality of members (the holder 30, the bus bar frame 600, and the heat shielding plate 700) disposed above the spacer unit 300 are locked to and are positioned with respect to the spacer unit 300. Hereinafter, the locking structures for locking the above-mentioned members are described in detail. In the description made hereinafter, portions relating to the locking structure of respective members are mainly described.

Figure 4:
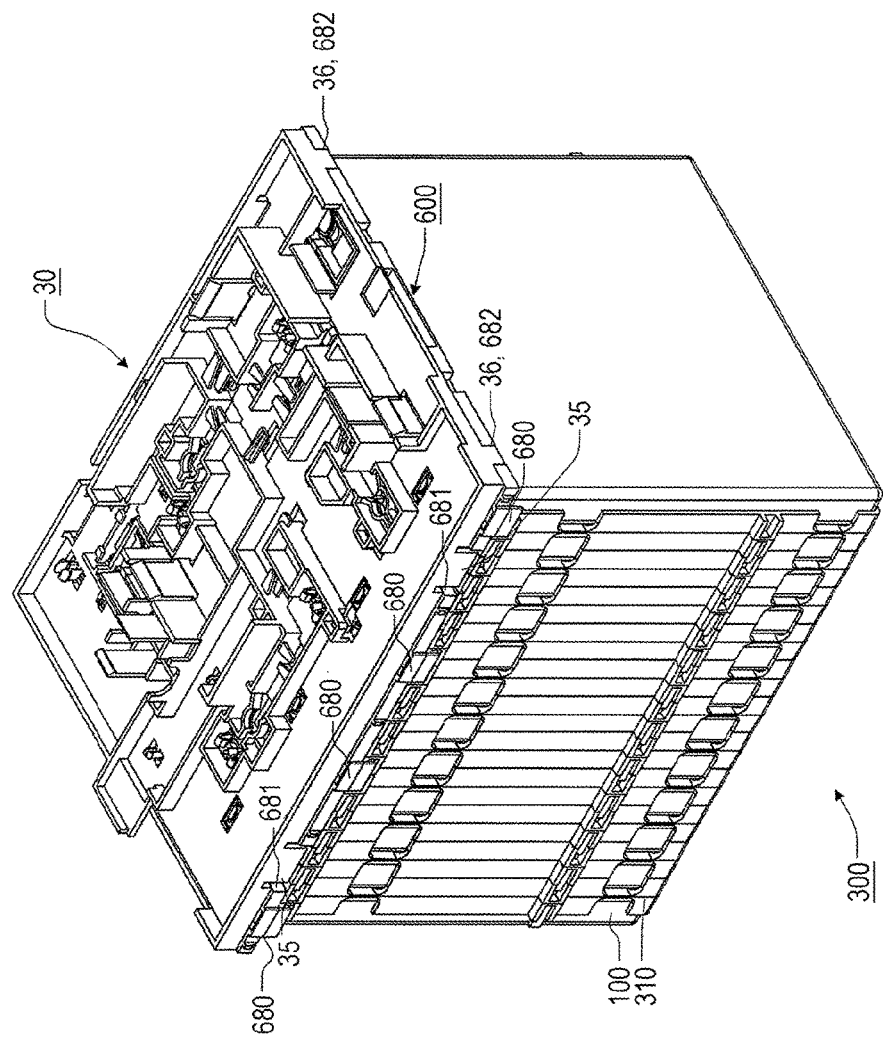
FIG. 4 is a perspective view showing a state where a holder and a bus bar frame according to the first embodiment are locked to a spacer unit.

FIG. 4 is a perspective view showing a state where the holder 30 and the bus bar frame 600 according to the first embodiment of the present invention are locked to the spacer unit 300. In FIG. 4, the heat shielding plate 700 is hidden by the holder 30 so that the heat shielding plate 700 is not shown in the drawing.

Figure 5:
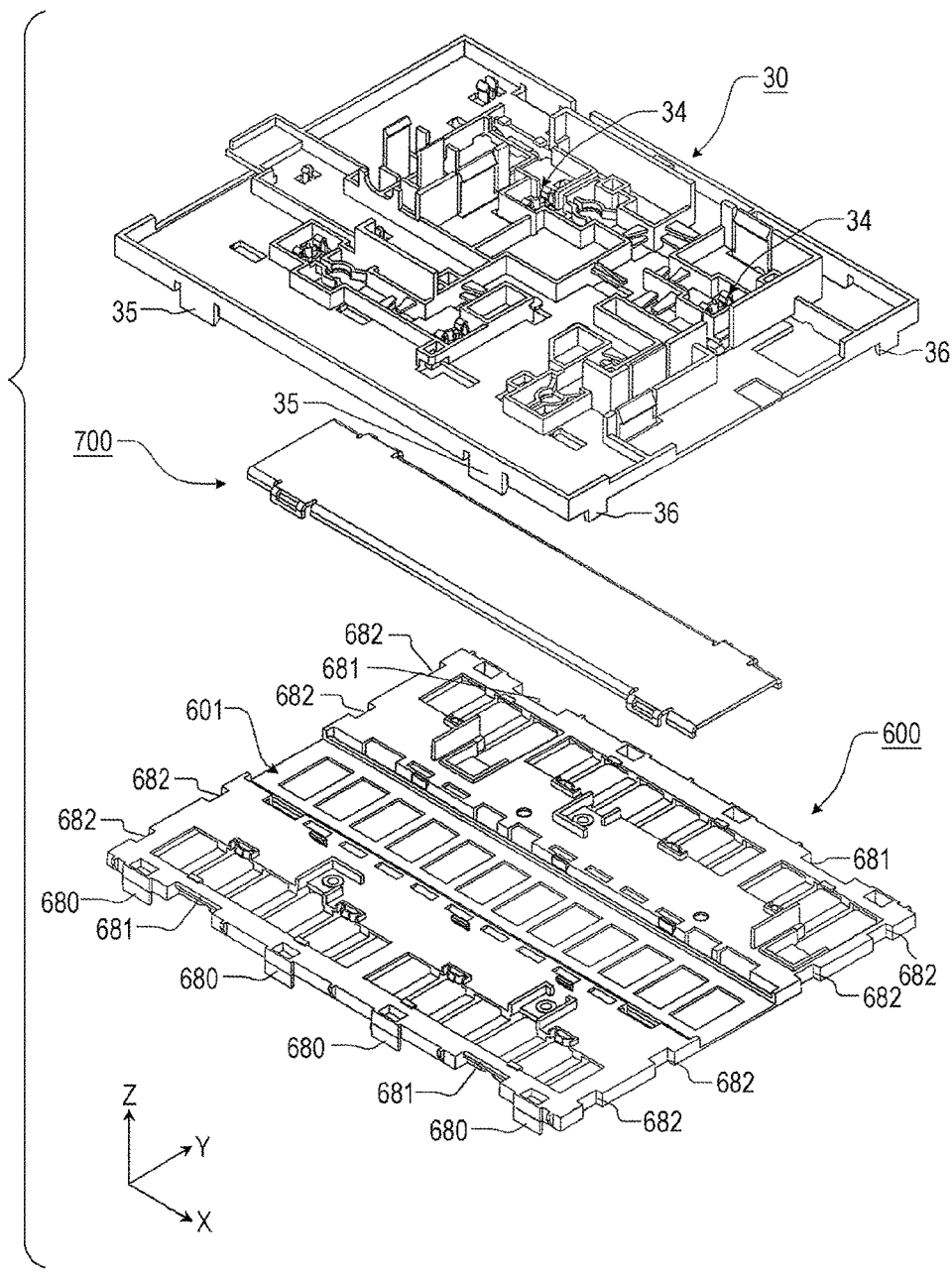
FIG. 5 is an exploded perspective view showing a schematic configuration of the holder, the bus bar frame and a heat shielding plate according to the first embodiment.

FIG. 5 is an exploded perspective view showing a schematic configuration of the holder 30, the bus bar frame 600 and the heat shielding plate 700 according to the first embodiment of the present invention.

As shown in FIG. 4 and FIG. 5, the bus bar frame 600, the heat shielding plate 700, and the holder 30 are stacked on the spacer unit 300 in the vertical direction from below. These bus bar frame 600, the heat shielding plate 700 and the holder 30 are individually locked by the spacer unit 300.

First, the spacers 310 which the spacer unit 300 includes are described in detail.

Figure 6:
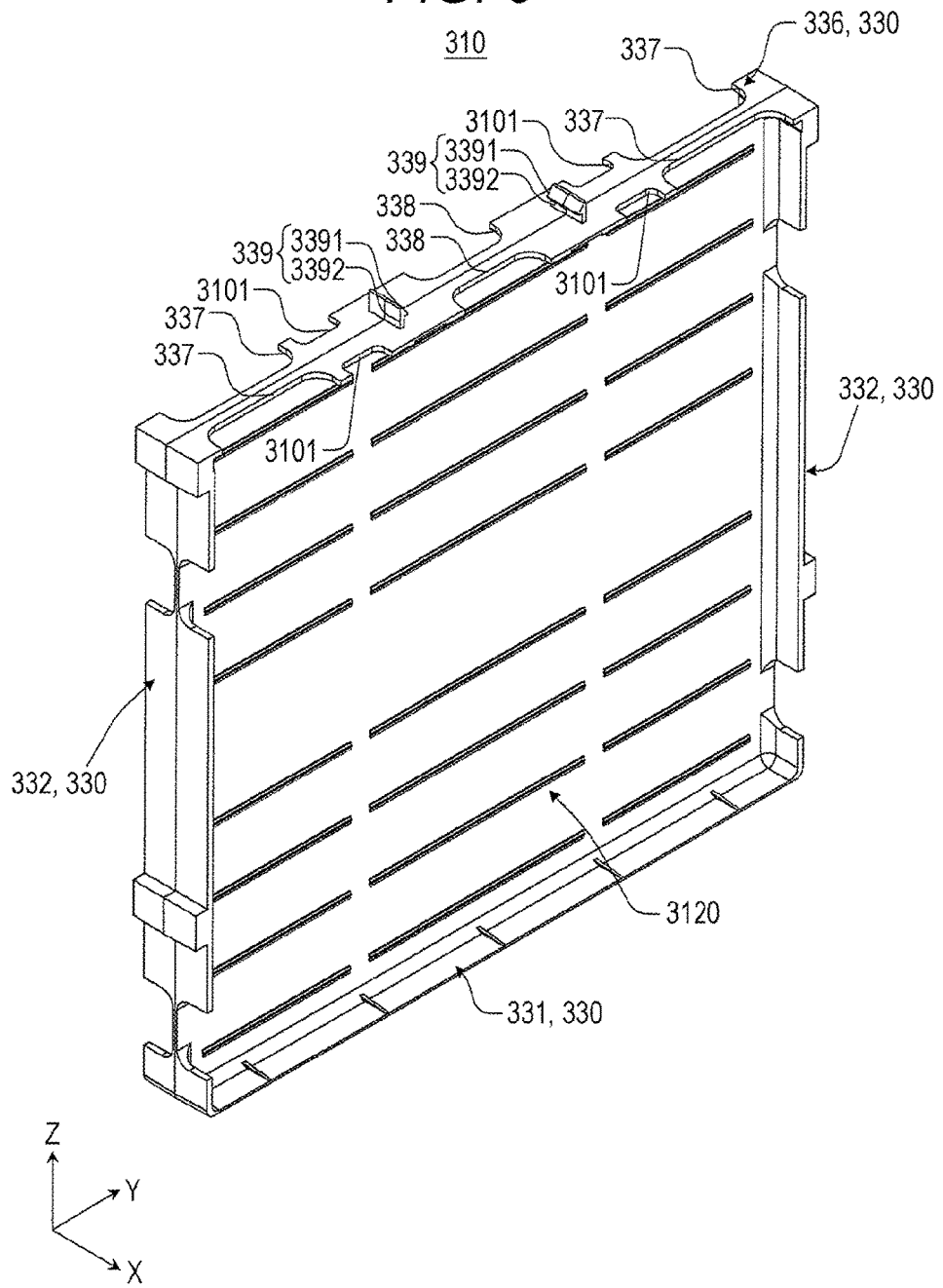
FIG. 6 is a perspective view showing a schematic configuration of a spacer according to the first embodiment.

FIG. 6 is a perspective view showing a schematic configuration of the spacer 310 according to the first embodiment of the present invention.

As described above, the spacer 310 shown in FIG. 6 is a member disposed between two energy storage devices 100 disposed adjacently to each other so as to provide insulation between two energy storage devices 100. The spacer 310 has an intermediate plate portion 3120 and a peripheral wall portion 330. The intermediate plate portion 3120 is a plate-like portion which is disposed between two energy storage devices 100 disposed adjacently to each other. The peripheral wall portion 330 is formed on a peripheral edge portion of the intermediate plate portion 3120 on a front surface side and a peripheral edge portion of the intermediate plate portion 3120 on a back surface side in a raised manner with respect to the intermediate plate portion 3120. A recessed portion which houses an approximately half of the energy storage device 100 (an approximately half of the energy storage device 100 on the front surface side or the back surface side when the energy storage device 100 is divided in two in the X axis direction) is defined by the peripheral wall portion 330 and the intermediate plate portion 3120.

A portion of the peripheral wall portion 330 disposed on a lower end portion of the intermediate plate portion 3120 is a bottom wall 331 which overlaps with a bottom portion of the energy storage device 100. The bottom wall 331 has the same shape on a front surface side and on a back surface side of the intermediate plate portion 3120. The bottom wall 331 is formed continuously with a uniform width over the entire longitudinal length of the intermediate plate portion 3120.

Portions of the peripheral wall portion 330 which are disposed on a pair of side portions of the intermediate plate portion 3120 are side walls 332 which overlap with side portions of the energy storage device 100.

A portion of the peripheral wall portion 330 which is disposed on an upper end portion of the intermediate plate portion 3120 is an upper wall 336 which oppositely faces an upper portion of the energy storage device 100. The upper wall 336 has the same shape on a front surface side of the intermediate plate portion 3120 and on a back surface side of the intermediate plate portion 3120. In both end portions of the upper wall 336 in the longitudinal direction, first openings 337 through which the positive electrode terminal and the negative electrode terminal of the energy storage devices 100 are individually exposed are formed. In a center portion of the upper wall 336 in the longitudinal direction, second openings 338 through which a safety valve of the energy storage device 100 is exposed is formed. In the upper wall 336, contact holes 3101 through which the thermistors 50 are brought into contact with the energy storage device 100 are formed between two first openings 337 and one second opening 338. A pair of locking portions 339 is formed on an upper surface of the upper wall 336 such that the locking portions 339 sandwich the second opening 338 in the longitudinal direction.

Each of the pair of locking portions 339 is formed of a pawl-shaped projection which projects upward from the upper surface of the upper wall 336. The pair of locking portions 339 is portions which lock the plurality of members (the holder 30, the bus bar frame 600, and the heat shielding plate 700) disposed on the spacer unit 300 individually. An inclined surface 3391 which approaches the second opening 338 as the inclined surface 3391 extends downward is formed on upper end portions of the pair of locking portions 339. A stepped portion is formed between a lower end of the inclined surface 3391 of each of the pair of locking portions 339 and a proximal portion 3392 below the lower end of the inclined surface 3391 so that the proximal portion 3392 is formed with a small thickness. Surfaces of the pair of locking portions 339 on a side opposite to the inclined surfaces 3391 are formed into a flat surface as a whole.

All of the plurality of spacers 310 which the spacer unit 300 includes have the same shape. With such a configuration, a height of the pair of locking portions 339 is set equal among the plurality of spacers 310. Even when the plurality of locking portions 339 have the same height, the respective locking portions 339 individually lock the plurality of members stacked in the vertical direction. The plurality of members are stacked in the vertical direction and hence, mounting positions of the respective members differ from each other in the vertical direction, and the positional relationships in the vertical direction between the respective members and the corresponding locking portions 339 also differ between the respective members. That is, portions to be locked (bus-bar-use projections 622 in FIG. 7 and FIG. 10, first ribs 711 in FIG. 8 and FIG. 11, and holding pawls 31 in FIG. 9 and FIG. 12) are disposed on the plurality of respective members at locking positions of the corresponding locking portions 339 respectively. The locking position includes not only the position in the vertical direction but also the position in the horizontal direction. The portions to be locked of the respective members are disposed corresponding to the locking positions of the locking portions 339 in the horizontal direction and hence, center portions of the respective members in the longitudinal direction are locked to the locking portions 339 respectively.

Hereinafter, the portions to be locked of the stacked respective members (the holder 30, the bus bar frame 600, the heat shielding plate 700) are described in detail.

First, the bus bar frame 600 is described.

Figure 7:
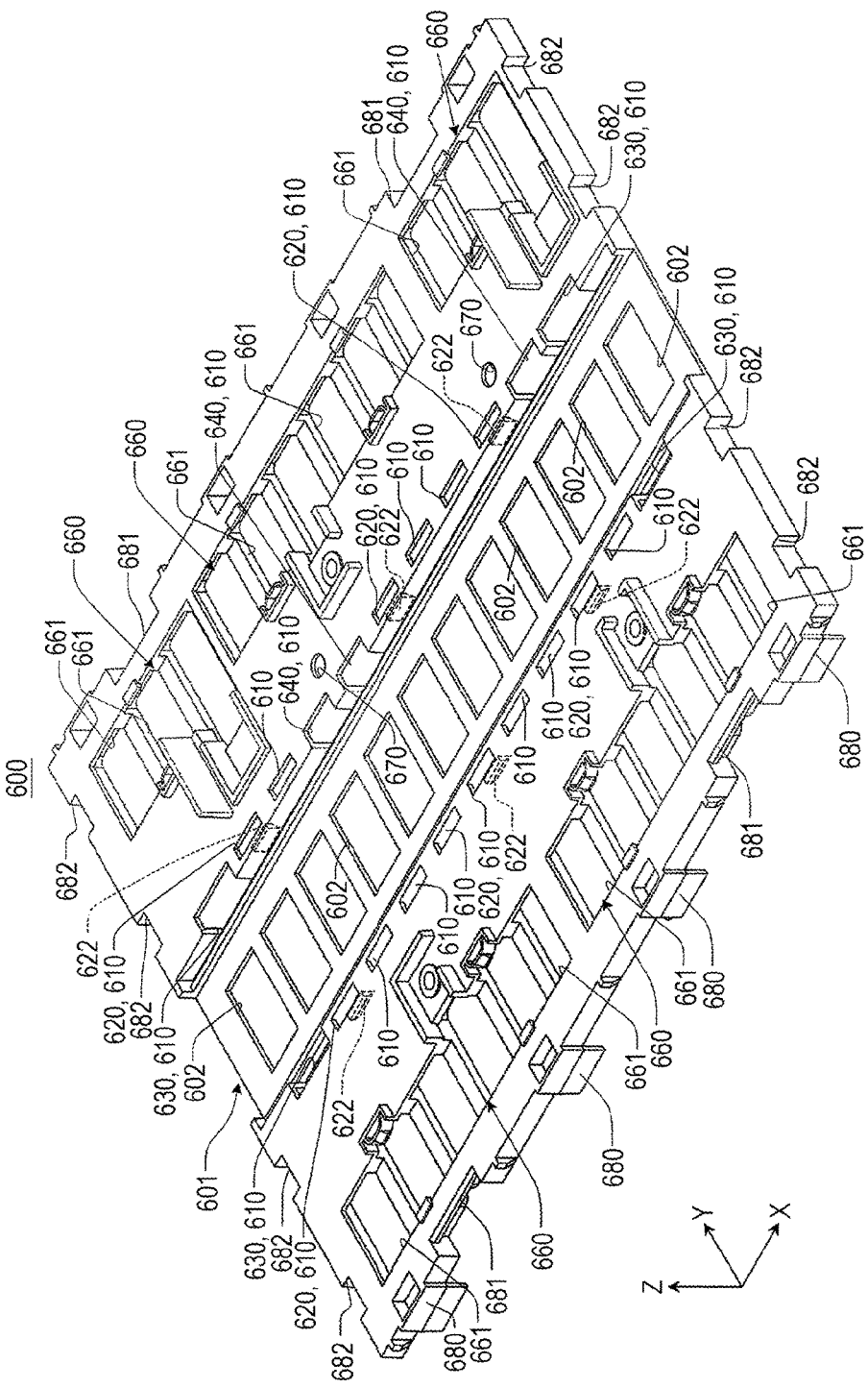
FIG. 7 is a perspective view showing a schematic configuration of the bus bar frame according to the first embodiment.

FIG. 7 is a perspective view showing a schematic configuration of the bus bar frame 600 according to the first embodiment of the present invention.

The bus bar frame 600 is a member having an approximately flat plate shape. On a center portion of the upper surface of the bus bar frame 600 in the longitudinal direction (X axis direction), a heat shielding recessed portion 601 in which the heat shielding plate 700 is accommodated is formed along the lateral direction (Y axis direction). On a bottom portion of the heat shielding recessed portion 601, a plurality of (twelve in this embodiment) safety-valve-use openings 602 are arranged in a row along the lateral direction. These safety-valve-use openings 602 are provided for allowing the safety valves of the respective energy storage devices 100 to expose individually through the openings 602 and to opposedly face the heat shielding plate 700.

In the upper surface of the bus bar frame 600, plural pairs (eleven pairs in this embodiment) of openings 610 through which the locking portions 339 of the respective spacers 310 are individually exposed are formed. The plural pairs of openings 610 are disposed at positions on outer edge portions of the heat shielding recessed portion 601 in the Y axis direction and at positions which correspond to the respective pairs of locking portions 339. Due to the plurality of pairs of openings 610, the locking portions 339 of the respective spacers 310 are communicated with an upper space of the bus bar frame 600.

The respective openings 610 are classified into bus-bar-use openings 620 for locking the bus bar frame 600, heat shielding openings 630 for locking the heat shielding plate 700, and holding openings 640 for locking the holder 30. In this embodiment, the case is exemplified where the respective openings 610 also include openings not used for locking. However, all openings 610 may be classified into the bus-bar-use openings 620, the heat shielding openings 630, and the holding openings 640. Further, it is preferable that the classification of the opening 610 into the bus-bar-use opening 620, the heat shielding opening 630 and the holding opening 640 be properly decided from viewpoints necessary for designing such as layout and strengths of the respective members.

In this embodiment, three pairs of bus-bar-use openings 620 are formed. In the bus-bar-use opening 620, a bus-bar-use projection 622 with which the locking portion 339 is engageable is formed on an inner side surface 621 (see FIG. 10) on a heat shielding recessed portion 601 side. The bus-bar-use projections 622 form the portions to be locked of the bus bar frame 600.

In this embodiment, two pairs of heat shielding openings 630 are formed. A region of the heat shielding opening 630 on a heat shielding recessed portion 601 side is also opened.

In this embodiment, three holding openings 640 are formed. Here, the respective openings 610 which make pairs with three holding openings 640 respectively may be also formed as the holding openings 640. A region of the holding opening 640 on a heat shielding recessed portion 601 side is also opened.

A plurality of (five in this embodiment) bus bar accommodating recessed portions 660 in which the plurality of bus bars 200 are placed individually are disposed on both end portions of the upper surface of the bus bar frame 600. On a bottom portion of the bus bar accommodating recessed portion 660, a plurality of terminal-use openings 661 through which the positive electrode terminal and the negative electrode terminal of each energy storage device 100 are individually exposed are formed. The positive electrode terminal and the negative electrode terminal of each energy storage device 100 and each bus bar 200 are electrically connected to each other through the terminal-use openings 661.

On the upper surface of the bus bar frame 600, through holes 670 through which the thermistors 50 are made to pass respectively are formed. The through holes 670 are disposed in the vicinity of the holding openings 640.

A plurality of pawl portions 680 which are engageable with some spacers 310 are formed in a downwardly projecting manner on both end edges of the bus bar frame 600 in the longitudinal direction. A plurality of first restricting recessed portions 681 which restrict the holder 30 are formed on both end edges of the bus bar frame 600 in the Y axis direction. On the other hand, a plurality of second restricting recessed portions 682 which restrict the holder 30 are formed on both end edges of the bus bar frame 600 in the X axis direction.

Next, the heat shielding plate 700 is described.

Figure 8:
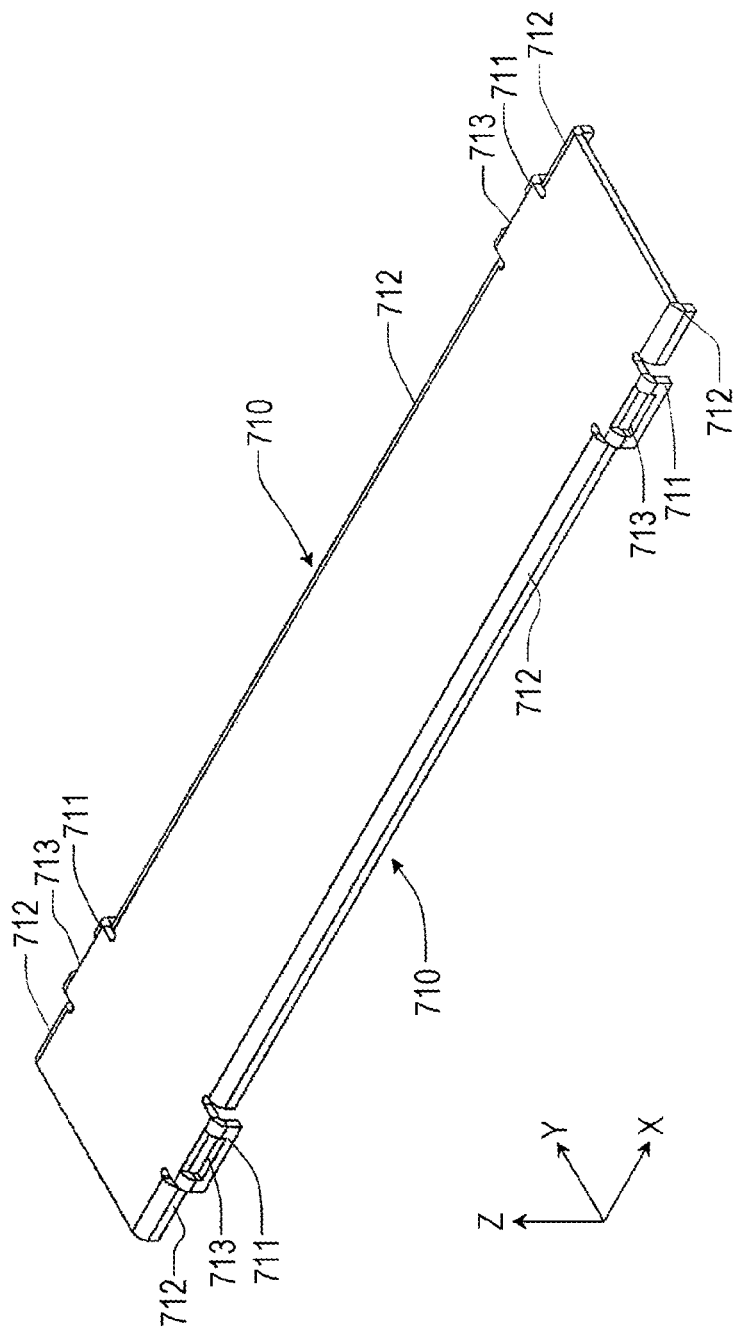
FIG. 8 is a perspective view showing a schematic configuration of the heat shielding plate according to the first embodiment.

FIG. 8 is a perspective view showing a schematic configuration of the heat shielding plate 700 according to the first embodiment of the present invention.

As shown in FIG. 8, the heat shielding plate 700 is a plate member elongated in the lateral direction (X axis direction) of the energy storage device 100. Both side portions of the heat shielding plate 700 are bent downwardly thus forming ribs 710 respectively. Portions of the rib 710 which respectively correspond to the heat shielding openings 630 form first ribs 711 which project more in the Y axis direction than other portions and enter the heat shielding openings 630 respectively. Other portions form second ribs 712.

An opening 713 with which the locking portion 339 of the spacer 310 is engaged when the first rib 711 enters the inside of the heat shielding opening 630 is formed in the first rib 711. That is, the first ribs 711 form the portions to be locked of the heat shielding plate 700.

Next, the holder 30 is described.

Figure 9:
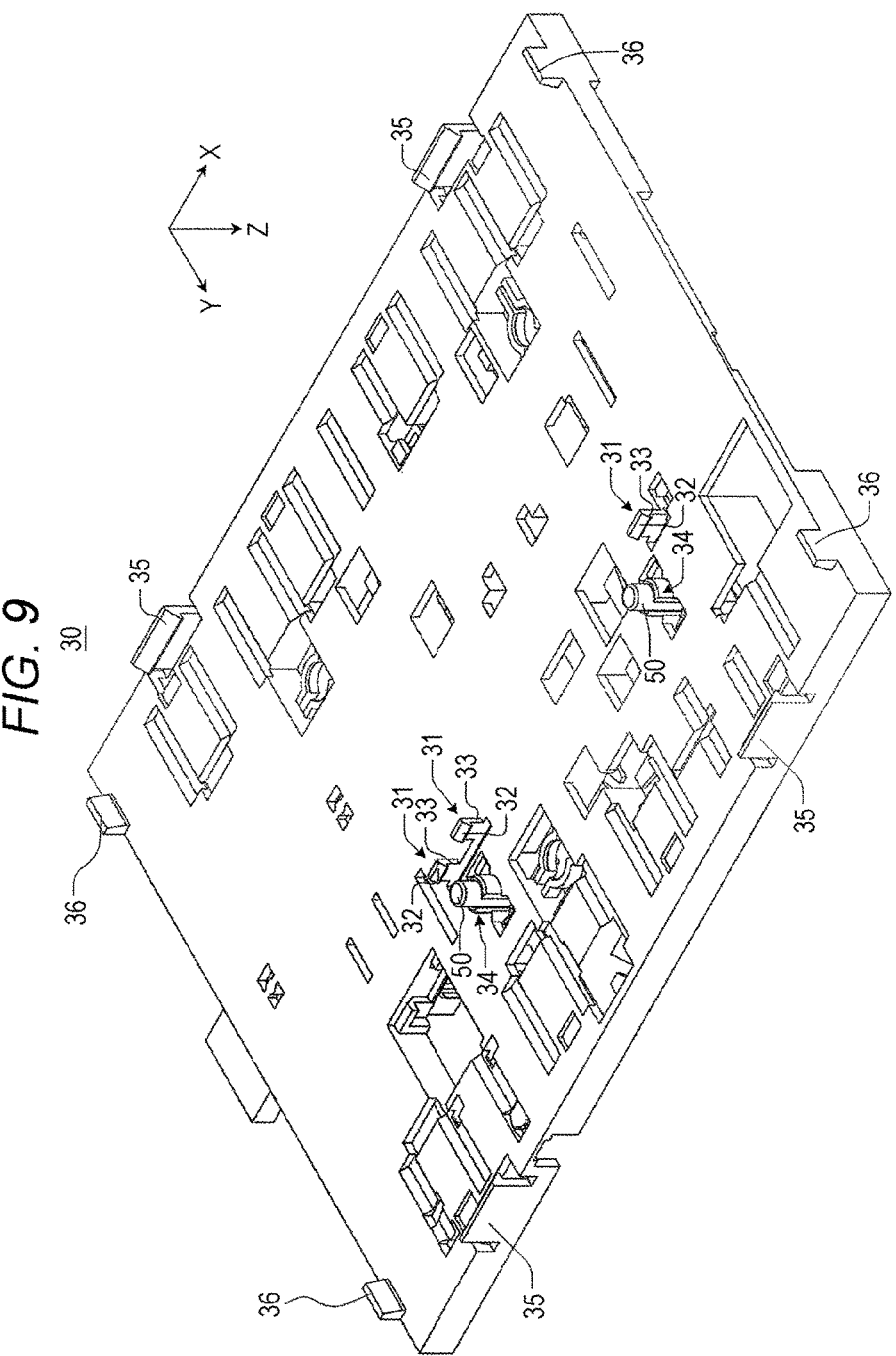
FIG. 9 is a perspective view showing a schematic configuration of the holder according to the first embodiment.

FIG. 9 is a perspective view showing a schematic configuration of the holder 30 according to the first embodiment of the present invention. Unlike the bus bar frame 600 shown in FIG. 7 and the heat shielding plate 700 shown in FIG. 8, FIG. 9 is a perspective view of the holder 30 as viewed from below.

As shown in FIG. 9, holding pawl portions 31 with which the locking portions 339 are respectively engaged are formed on a lower surface of the holder 30 in a downwardly projecting manner. The holding pawl portions 31 form the portions to be locked of the holder 30. A surface of a lower end portion of the holding pawl portion 31 which oppositely faces the locking portion 339 forms an inclined surface 32. The inclined surface 32 is inclined such that the more upward the inclined surface 32 extends, the more outward the inclined surface 32 extends. A stepped portion is formed between an upper end of the inclined surface 32 of the holding pawl portion 31 and an upper portion 33 of the holding pawl portion 31 formed above the upper end of the inclined surface 32, and the upper portion 33 is formed with a small thickness. A surface of the holding pawl portion 31 on a side opposite to the inclined surface 32 is formed into a flat surface as a whole.

Sensor holding portions 34 which hold the thermistors 50 are disposed in the vicinity of the holding pawl portions 31. The sensor holding portion 34 holds the thermistor 50 such that the thermistor 50 disposed in the through hole 670 of the bus bar frame 600 and the contact hole 3101 of the spacer 310 is brought into pressure contact with the energy storage device 100.

Further, a plurality of first restricting projecting portions 35 which are individually engaged with the first restricting recessed portions 681 of the bus bar frame 600 are formed on both end edges of the holder 30 in the Y axis direction in a downwardly projecting manner. On the other hand, a plurality of second restricting projecting portions 36 which are individually engaged with the second restricting recessed portions 682 of the bus bar frame 600 are formed on both end edges of the holder 30 in the X axis direction in a downwardly projecting manner. Since the first restricting projecting portions 35 and the second restricting projecting portions 36 of the holder 30 are respectively engaged with the first restricting recessed portions 681 and the second restricting recessed portions 682 of the bus bar frame 600, the holder 30 is fixed to the bus bar frame 600 in a restricted manner.

As shown in FIG. 4, when the bus bar frame 600, the heat shielding plate 700, and the holder 30 are assembled to the spacers 310, the pawl portions 680 of the bus bar frame 600 are engaged with some spacers 310. The first restricting projecting portions 35 of the holder 30 are respectively engaged with the first restricting recessed portions 681 of the bus bar frame 600, and the second restricting projecting portions 36 of the holder 30 are respectively engaged with the second restricting recessed portions 682 of the bus bar frame 600.

The description is made with respect to an engagement state between the respective portions to be locked and the locking portions 339 of the spacer 310 after being assembled.

First, an engagement state between the bus-bar-use projection 622 which forms the portion to be locked of the bus bar frame 600 and the locking portion 339 of the spacer 310 is described. Assuming the bus bar frame 600 as a first member, the spacer 310 with which the bus bar frame 600 is engaged is assumed as a first spacer.

Figure 10:
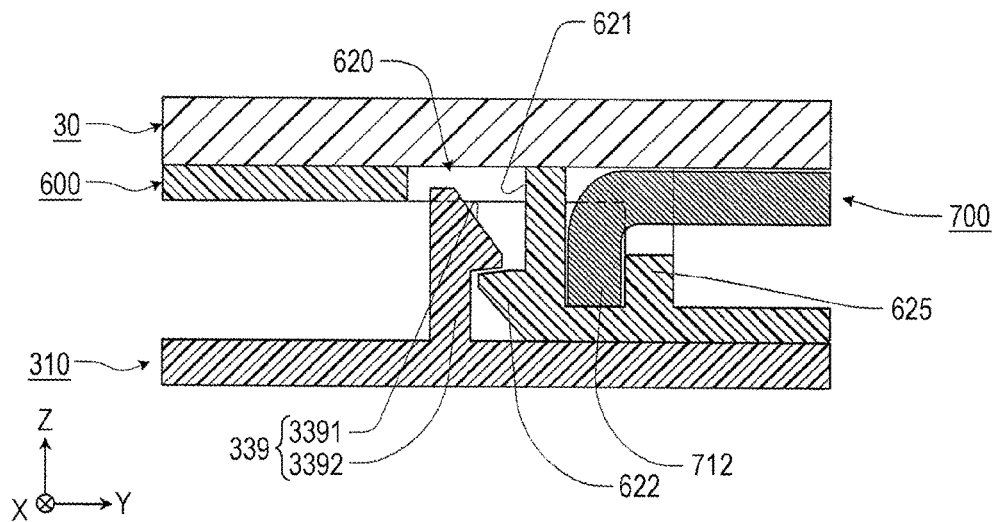
FIG. 10 is a cross-sectional view showing an engagement state between a bus-bar-use projection of the bus bar frame and an engaging portion of the spacer according to the first embodiment.

FIG. 10 is a cross-sectional view showing an engagement state between the bus-bar-use projection 622 of the bus bar frame 600 and the locking portion 339 of the spacer 310 according to the first embodiment of the present invention. FIG. 10 is a cross-sectional view of the bus-bar-use projection 622 and the locking portion 339 taken along a Y-Z plane.

As shown in FIG. 10, in a state where the bus bar frame 600 is placed on the upper surface of the spacer 310, the bus-bar-use projection 622 is disposed at a position below the inclined surface 3391 of the locking portion 339. Such a position is a locking position of the locking portion 339. In assembling the bus bar frame 600 to the spacer 310 from above at the time of assembling, the locking portion 339 is pushed outward (toward a minus side in the Y axis direction in FIG. 10) by the bus-bar-use projection 622. Thereafter, when the bus-bar-use projection 622 passes the inclined surface 3391 of the locking portion 339, the locking portion 339 returns to an initial position so that the engagement state shown in FIG. 10 is brought about. Accordingly, an upward movement of the bus bar frame 600 is restricted. That is, the locking portions 339 lock the bus bar frame 600 in a state where the locking portions 339 support the bus bar frame 600 toward the spacer 310. In such an engagement state, an upper end portion of the locking portion 339 is disposed in the inside of the bus-bar-use opening 620 and hence, usually, the locking portion 339 does not interfere with the bus bar frame 600.

On the upper surface of the bus bar frame 600, protrusions 625 which are raised inside the second ribs 712 of the heat shielding plate 700 are formed along the X axis direction. Due to the protrusions 625, the movement of the whole heat shielding plate 700 in the Y axis direction is restricted.

Next, an engagement state between the first rib 711 which forms the portion to be locked of the heat shielding plate 700 and the locking portion 339 of the spacer 310 is described. Assuming the heat shielding plate 700 as the second member, the spacer 310 which locks the heat shielding plate 700 is assumed as the second spacer.

Figure 11:
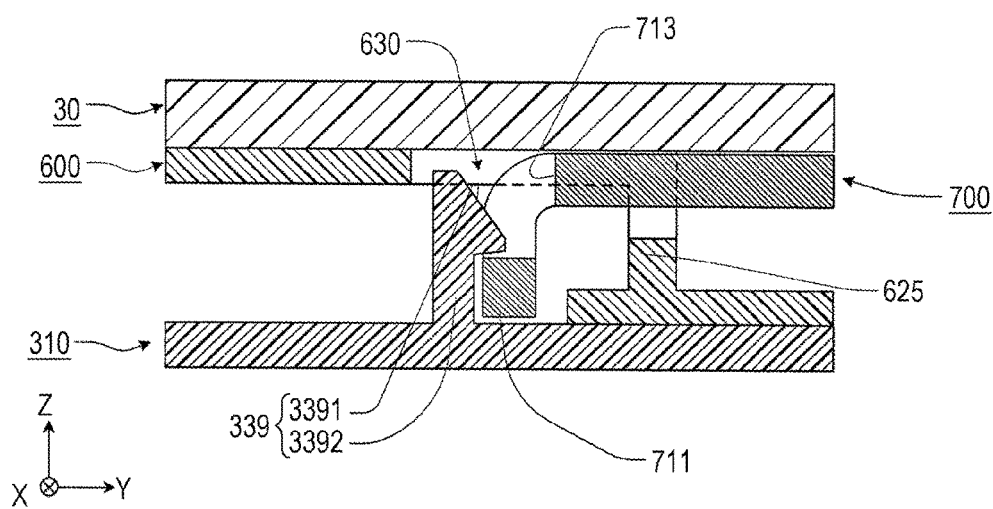
FIG. 11 is a cross-sectional view showing an engagement state between a first rib of the heat shielding plate and a locking portion of the spacer according to the first embodiment.

FIG. 11 is a cross-sectional view showing an engagement state between the first rib 711 of the heat shielding plate 700 and the locking portion 339 of the spacer 310 according to the first embodiment of the present invention. FIG. 11 is a cross-sectional view of the first rib 711 and the locking portion 339 taken along the Y-Z plane.

As shown in FIG. 11, in a state where the heat shielding plate 700 is placed on the upper surface of the bus bar frame 600, a distal end portion of the first rib 711 is disposed at a position below the inclined surface 3391 of the locking portion 339. Such a position is a locking position of the locking portion 339. In assembling the heat shielding plate 700 on the bus bar frame 600 from above at the time of assembling the energy storage apparatus 1, a distal end portion of the first rib 711 comes into contact with the locking portion 339 through the heat shielding opening 630, and pushes the locking portion 339 outward (toward a minus side in the Y axis direction in FIG. 11). Thereafter, when the distal end portion of the first rib 711 passes the inclined surface 3391 of the locking portion 339, the locking portion 339 returns to an initial position and is accommodated in the inside of the opening 713. Accordingly, the first rib 711 is brought into an engagement state shown in FIG. 11 so that the upward movement of the heat shielding plate 700 is restricted. That is, the locking portion 339 locks the heat shielding plate 700 in a state where the locking portion 339 supports the heat shielding plate 700 toward the spacer 310. In the engagement state, an upper end portion of the locking portion 339 is disposed in the inside of the heat shielding opening 630 and hence, usually, the locking portion 339 does not interfere with the heat shielding plate 700.

Next, an engagement state between the holding pawl portion 31 which forms the portion to be locked of the holder 30 and the locking portion 339 of the spacer 310 is described. Assuming the holder 30 as the third member, the spacer 310 which locks the holder 30 is assumed as the third spacer.

Figure 12:
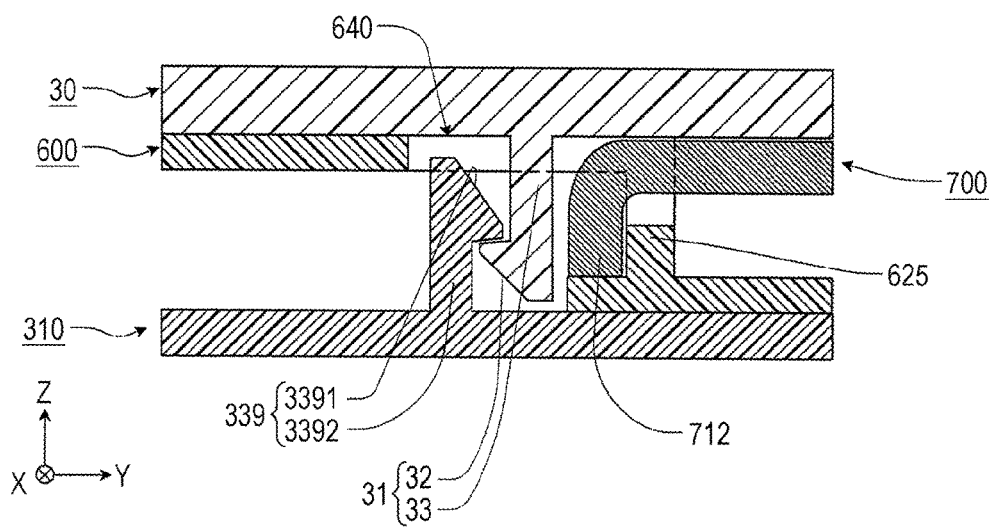
FIG. 12 is a cross-sectional view showing an engagement state between a holding pawl portion of the holder and a locking portion of the spacer according to the first embodiment.

FIG. 12 is a cross-sectional view showing an engagement state between the holding pawl portion 31 of the holder 30 and the locking portion 339 of the spacer 310 according to the first embodiment of the present invention. FIG. 12 is a cross-sectional view of the holding pawl portion 31 and the locking portion 339 taken along a YZ plane.

As shown in FIG. 12, when the holder 30 is placed on the upper surface of the heat shielding plate 700, the inclined surface 32 of the holding pawl portion 31 is disposed at a position below the inclined surface 3391 of the locking portion 339. Such a position is a locking position of the locking portion 339. In assembling the holder 30 on the heat shielding plate 700 from above at the time of assembling the energy storage apparatus 1, the inclined surface 32 of the holding pawl portion 31 comes into contact with the locking portion 339 through the holding opening 640 and expands the locking portion 339 outward (toward a minus side in the Y axis direction in FIG. 12) by pushing. When the inclined surface 32 of the holding pawl portion 31 passes the inclined surface 3391 of the locking portion 339, the locking portion 339 returns to an initial position. Accordingly, the engagement state shown in FIG. 12 is brought about so that an upward movement of the holder 30 is restricted. That is, the locking portion 339 locks the holder 30 in a state where the locking portion 339 supports the holder 30 toward the spacer 310. In the engagement state, an upper end portion of the locking portion 339 is disposed in the inside of the holding opening 640 and hence, usually, the locking portion 339 does not interfere with the holder 30.

As has been described heretofore, according to the energy storage apparatus 1 of the first embodiment of the present invention, the plurality of locking portions 339 which individually lock the plurality of members (the holder 30, the bus bar frame 600, and the shielding plate 700) disposed above the spacer unit 300 are provided to the spacer unit 300. With such a configuration, the plurality of members can be locked using the spacer unit 300 as the reference. Accordingly, the reference for assembling for the plurality of members can be made uniform, and assembling accuracy can be enhanced. Further, the plurality of members can be locked without using screws, an adhesive agent and the like and hence, a manufacturing cost can be suppressed.

The spacer 310 which forms the first spacer locks the bus bar frame 600, the spacer 310 which forms the second spacer locks the heat shielding plate 700, and the spacer 310 which forms the third spacer locks the holder 30. In this manner, one spacer 310 is used for locking one member and hence, the respective members can be locked by the spacers 310 in a stable manner compared to a case where the plurality of members are locked by one spacer 310.

The plurality of members are locked by the locking portions 339 in a state where the plurality of members are supported toward the spacers 310 respectively and hence, coming off of the plurality of members can be suppressed.

The plurality of members are stacked in the vertical direction. Accordingly, the plurality of members which are disposed in this manner can be also locked by the plurality of locking portions respectively.

The portions to be locked (the bus-bar-use projections 622, the first ribs 711, the holding pawl portions 31) of the plurality of members are disposed at the locking positions of the locking portions 339 which correspond to the portions to be locked. Accordingly, even when the plurality of locking portions 339 of the respective members are disposed at the same height, the respective locking portions 339 can be locked to the portions to be locked of the respective members. Accordingly, the plurality of locking portions 339 can be disposed at the same height.

The plurality of spacers 310 have the same shape and hence, a manufacturing cost of the spacers 310 can be suppressed.

The thermistors 50 are disposed in the vicinity of the locking portions 339 which lock the holder 30 and hence, coming off of the holder 30 brought about when the thermistors 50 are mounted on the energy storage device 100 can be suppressed by the locking portions 339. The holding pawl portions 31 which form the portions to be locked are disposed in the vicinity of the thermistors 50 and hence, rigidity of portions of the holder 30 in the vicinity of the thermistors 50 can be enhanced thus providing the structure where the holder 30 minimally comes off. Accordingly, a close contact of the thermistor 50 with the energy storage device 100 can be enhanced.

The locking portions 339 lock the center portions of the plurality of members respectively and hence, coming off of the center portions of the members can be suppressed. To surely suppress coming off of the plurality of members, it is preferable to lock each member to a member disposed just below the member. For example, in this embodiment, the bus bar frame 600 is locked to the spacer 310 which is the member disposed just below the bus bar frame 600.

Although the energy storage apparatus according to the first embodiment of the present invention has been described heretofore, the present invention is not limited to the above-mentioned embodiment. That is, it should be construed that the first embodiment disclosed in this specification is only for an exemplifying purpose in all aspects and is not limited. The scope of the present invention is not designated by the above-mentioned description but is designated by Claims, and it is intended that all modifications which fall within the meaning and the scope equivalent to Claims are also included in the scope of the present invention.

For example, in the first embodiment, the case is exemplified where all of the plurality of spacers 310 include the locking portions 339. However, the locking portions 339 may not be provided to spacers which are not used for locking the plurality of members individually.

In the first embodiment, the case is exemplified where the pair of locking portions 339 is provided to one spacer 310. However, the number of locking portions 339 per one spacer 310 may be one or three or more.

In the first embodiment, the case is exemplified where the plurality of locking portions 339 provided to one spacer 310 lock the same member. However, the plurality of locking portions 339 provided to one spacer 310 may lock different members respectively. In this case, a plurality of members can be assembled in a stable manner using a single spacer as the reference for assembling.

Figure 13:
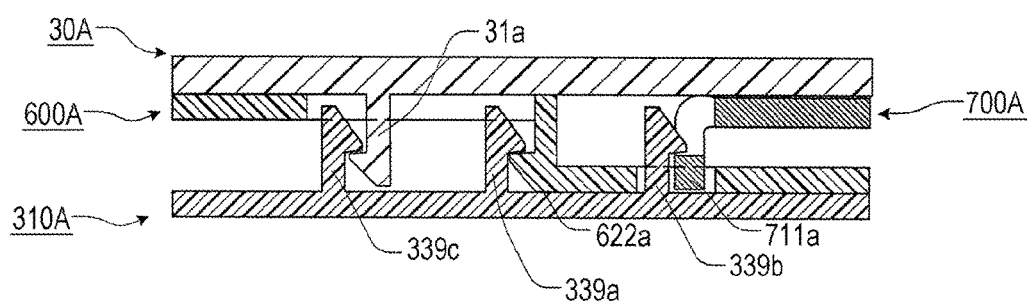
FIG. 13 is a cross-sectional view showing a structure for engaging all of the bus bar frame, the heat shielding plate and the holder by one spacer as a modification.

FIG. 13 is a cross-sectional view showing a modification of the first embodiment having a structure where all of a bus bar frame 600A, a heat shielding plate 700A and a holder 30A are locked by one spacer 310A.

As shown in FIG. 13, a locking portion 339a dedicated to the bus bar frame 600A, a locking portion 339b dedicated to the heat shielding plate 700A, and a locking portion 339c dedicated to the holder 30A are integrally formed on the spacer 310A. A bus-bar-use projection 622a with which the locking portion 339a is engaged is formed on the bus bar frame 600A at a position corresponding to a height of the locking portion 339a. A rib 711a with which the locking portion 339b is engaged is formed on the heat shielding plate 700A at a position corresponding to a height of the locking portion 339b. A holding pawl portion 31a with which the locking portion 339c is engaged is formed on the holder 30A at a position corresponding to a height of the locking portion 339c.

With such a structure, the plurality of members (the bus bar frame 600A, the heat shielding plate 700A and the holder 30A) disposed at different heights can be locked by one spacer 310A.

In the first embodiment, the case is exemplified where the locking portions 339 are provided to the spacers 310 disposed between each two of the plurality of energy storage devices 100. However, at least one of the first sub spacer 320 and the second sub spacer 321 disposed on each side of the unit formed of the plurality of energy storage devices 100 may include locking portions.

In the first embodiment, the case is exemplified where the plurality of members locked by the locking portions 339 are the bus bar frame 600, the heat shielding plate 700 and the holder 30. However, besides such members, other members which are disposed above the spacer unit 300 may be locked by the locking portion 339.

In the first embodiment, the case is exemplified where the plurality of members (the bus bar frame 600, the heat shielding plate 700, the holder 30) are respectively formed as an integral body. However, the plurality of members may respectively have the split structure. In this case, it is preferable that a plurality of locking portions which individually lock the split portions be provided to the spacer unit. The split portions are disposed in a row in the horizontal direction.

The respective constitutional elements which the first embodiment includes and the respective constitutional elements which the modification includes may be combined with each other as desired.

The invention which includes the first embodiment and the modification is applicable to an energy storage apparatus provided with energy storage devices and an outer covering.

(Second Embodiment)

Hereinafter, an energy storage apparatus according to a second embodiment of the present invention is described with reference to drawings. The second embodiment described hereinafter is one preferred specific example of the present invention. In the second embodiment described hereinafter, numerical values, shapes, materials, constitutional elements, the arrangement positions and connection states of the constitutional elements, respective steps in the manufacturing method, the order of the steps and the like are merely examples, and these are not intended to be used for limiting the present invention. Further, out of the constitutional elements in the second embodiment described hereinafter, the constitutional elements which are not described in independent claims describing an uppermost concept are described as arbitrary constitutional elements.

Respective views in the attached drawings are schematic views and are not always described strictly accurately. In the respective drawings, constitutional elements identical with each other or similar to each other are given the same symbols. In the following description of the second embodiment, there may be cases where expressions which contain "approximately" such as "approximately half" and "approximately horizontal" are used. For example, "approximately horizontal" means not only a completely horizontal state but also a substantially horizontal state. That is, the term "approximately" includes also approximately several % of tolerance, for example. The same goes for other expressions which contain "approximately".

First, the configuration of the energy storage apparatus 1 is described. In the description made hereinafter, parts having substantially the same function as the corresponding parts in the above-mentioned first embodiment are given the same symbols, and the description of these parts may be omitted.

Figure 14:
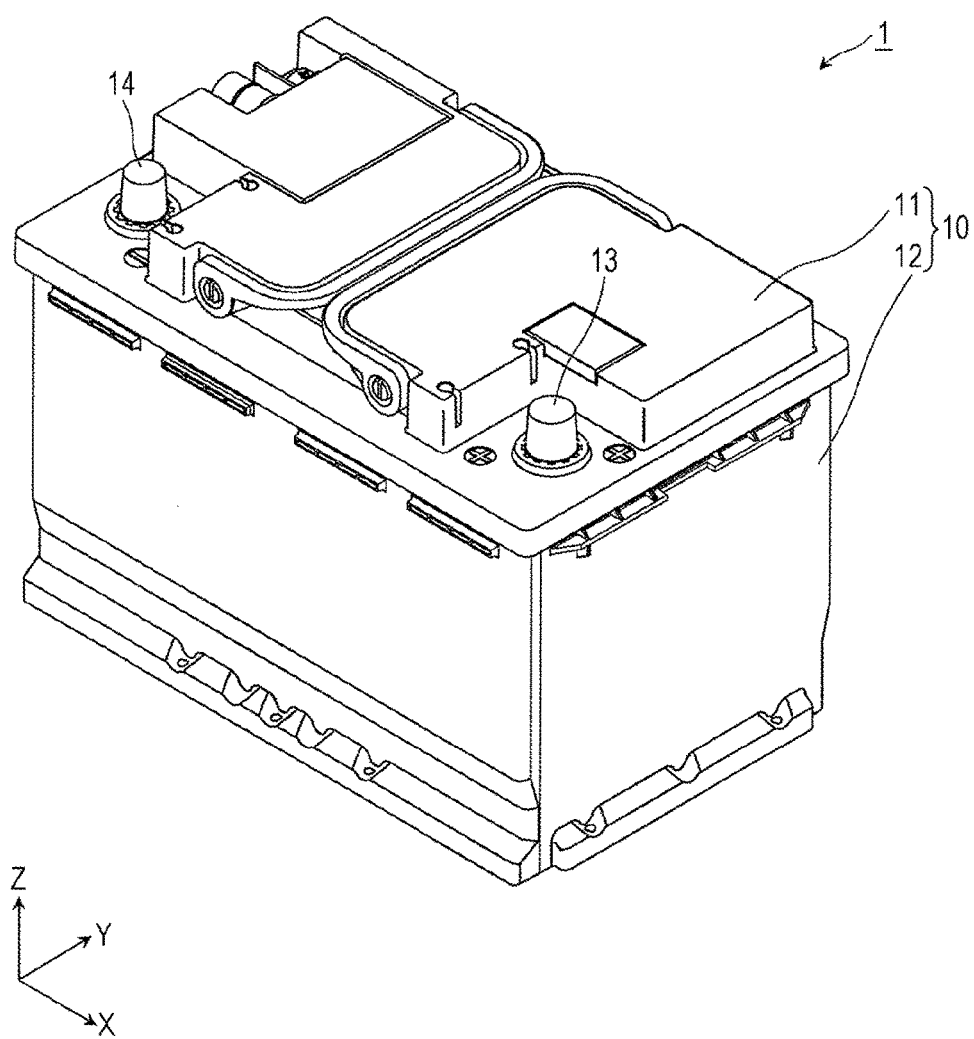
FIG. 14 is a perspective view showing an external appearance of an energy storage apparatus according to a second embodiment.
Figure 15:
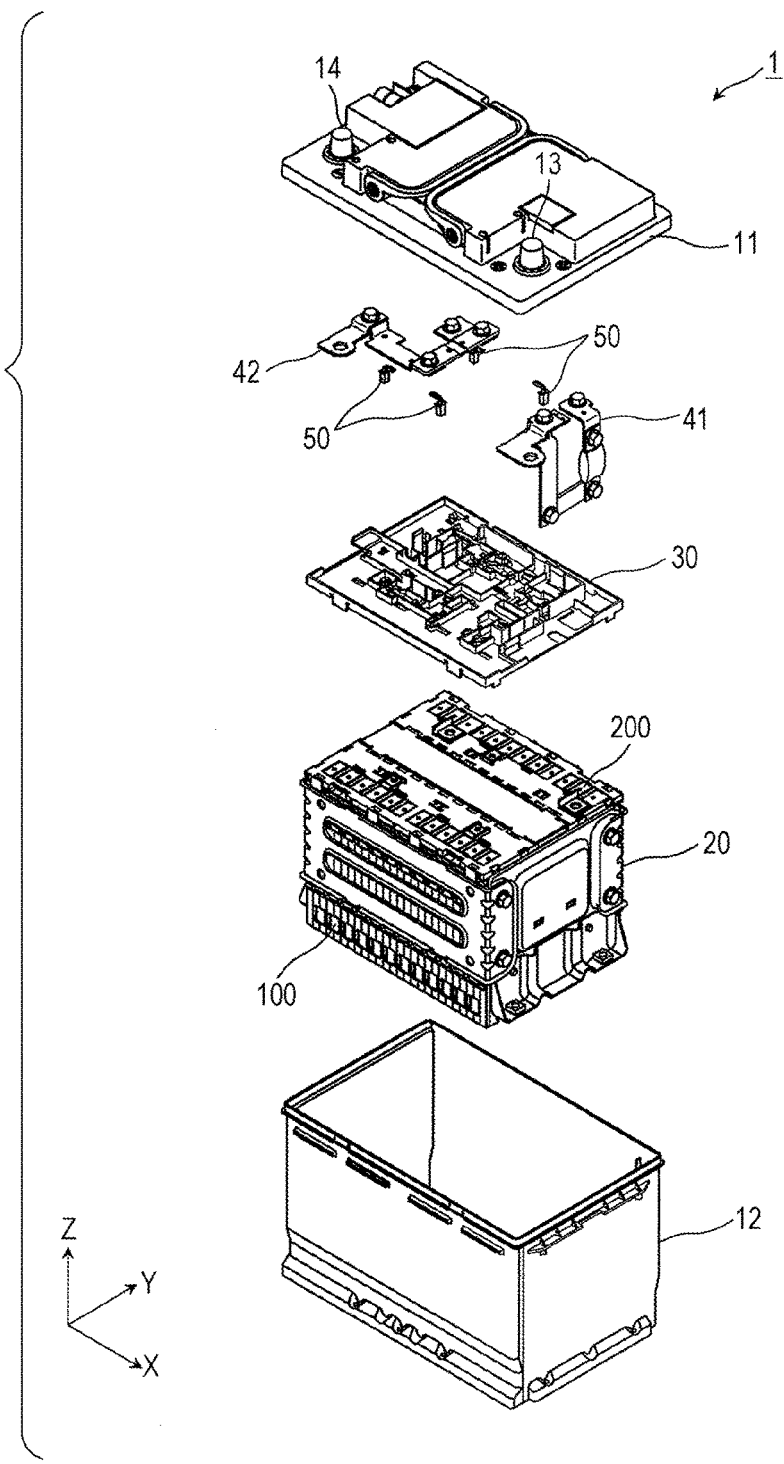
FIG. 15 is an exploded perspective view showing respective constitutional elements of the energy storage apparatus according to the second embodiment in a disassembled state.

FIG. 14 is a perspective view showing an external appearance of the energy storage apparatus 1 according to the second embodiment of the present invention. FIG. 15 is an exploded perspective view showing respective constitutional elements of the energy storage apparatus 1 according to the second embodiment of the present invention in a disassembled state.

In the same manner as the first embodiment, the energy storage apparatus 1 is an apparatus which can charge electricity from the outside of the energy storage apparatus 1 therein and can discharge electricity to the outside of the energy storage apparatus 1. For example, in the same manner as the first embodiment, the energy storage apparatus 1 is a battery module used for power storage application, power source application or the like.

As shown in FIG. 14 and FIG. 15, in the same manner as the first embodiment, the energy storage apparatus 1 includes: an outer covering 10 formed of a first outer covering 11 and a second outer covering 12; and an energy storage unit 20, a holder 30, bus bars 41, 42, thermistors 50 and the like which are housed in the outer covering 10.

In this embodiment, electric equipment such as a printed circuit board and a relay is disposed in the inside of the first outer covering 11. However, the electric equipment is not shown in the drawing. That is, the first outer covering 11 is formed of two members which are dividable in the vertical direction (Z axis direction), and the electric equipment is disposed between two members. With such a configuration, the electric equipment is protected from an impact and, at the same time, it is possible to avoid the electric equipment from coming into contact with an external metal member or the like.

The printed circuit board includes a control circuit, for example. The control circuit is connected to energy storage devices 100 disposed in the inside of the energy storage unit 20 described later by wiring, and acquires, monitors and controls various kinds of information such as a charging state and a discharging state of the energy storage devices 100, a voltage value, a current value, and temperatures of the energy storage devices 100. The control circuit also controls turning on and off of relays and performs communication with other equipment. Temperatures of the above-mentioned energy storage devices 100 are temperatures obtained by using the thermistors 50. That is, the control circuit is connected to the thermistors 50 provided in a state where the thermistors 50 are brought into contact with the energy storage devices 100 via wirings (lead lines), and temperatures of the energy storage devices 100 are acquired by converting information (resistance value) transmitted from the thermistors 50 into temperatures. The control circuit is described in detail later.

In the same manner as the first embodiment, the energy storage unit 20 includes: a plurality of energy storage devices 100 (twelve energy storage devices 100 in this embodiment); and a plurality of bus bars 200. The energy storage unit 20 is electrically connected to a positive electrode external terminal 13 and a negative electrode external terminal 14 mounted on the first outer covering 11.

In this embodiment, the holder 30 is an electric component tray which holds electric components such as bus bars 41, 42, and other relays and wirings (not shown in the drawing) thereon, can provide insulation between the bus bars 41, 42 and other members, and can regulate positions of the bus bars 41, 42 and the like. Particularly, in the same manner as the energy storage apparatus 1 described in the first embodiment, the holder 30 positions the bus bars 41, 42 with respect to the bus bars 200, the positive electrode external terminal 13 and the negative electrode external terminal 14 disposed in the inside of the energy storage unit 20.

The holder 30 also has a function of holding the thermistors 50. To be more specific, in this embodiment, opening portions are formed in the holder 30. The thermistors 50 can be positioned with respect to the energy storage devices 100 by inserting the thermistors 50 into the opening portions, and the thermistors 50 are fixed in a state where the thermistors 50 are pressed to the energy storage devices 100. That is, the holder 30 is disposed in an opposedly facing manner with the energy storage devices 100 so that, as a first member, the holder 30 also has a function of making the thermistors 50 engage with the holder 30 and biasing the thermistors 50 toward the energy storage devices 100. The configuration for mounting the thermistors 50 on the holder 30 is described in detail later.

The thermistor 50 is a temperature sensor which is disposed in a direction which intersects with the holder 30, and is mounted on the energy storage device 100. That is, the thermistor 50 is mounted in a state where the thermistor 50 is pressed to a lid portion of the energy storage device 100 and measures a temperature of the energy storage device 100. In this embodiment, four thermistors 50 are disposed for four energy storage devices 100. However, the number of thermistors 50 is not particularly limited.

To be more specific, the thermistors 50 are positioned with respect to the energy storage device 100 such that the thermistors 50 are mounted on the holder 30 and, thereafter, the holder 30 is mounted on the energy storage device 100. The thermistors 50 are disposed by being pressed to the energy storage device 100. The principle that the thermistor 50 measures a temperature of the energy storage device 100 is substantially equal to the principle of a conventional thermistor and hence, the detailed description of the principle is omitted. The configuration of the thermistor 50 and the configuration for mounting the thermistor 50 on the energy storage device 100 are described in detail later.

Next, the configuration of the energy storage unit 20 is described in detail.

Figure 16:
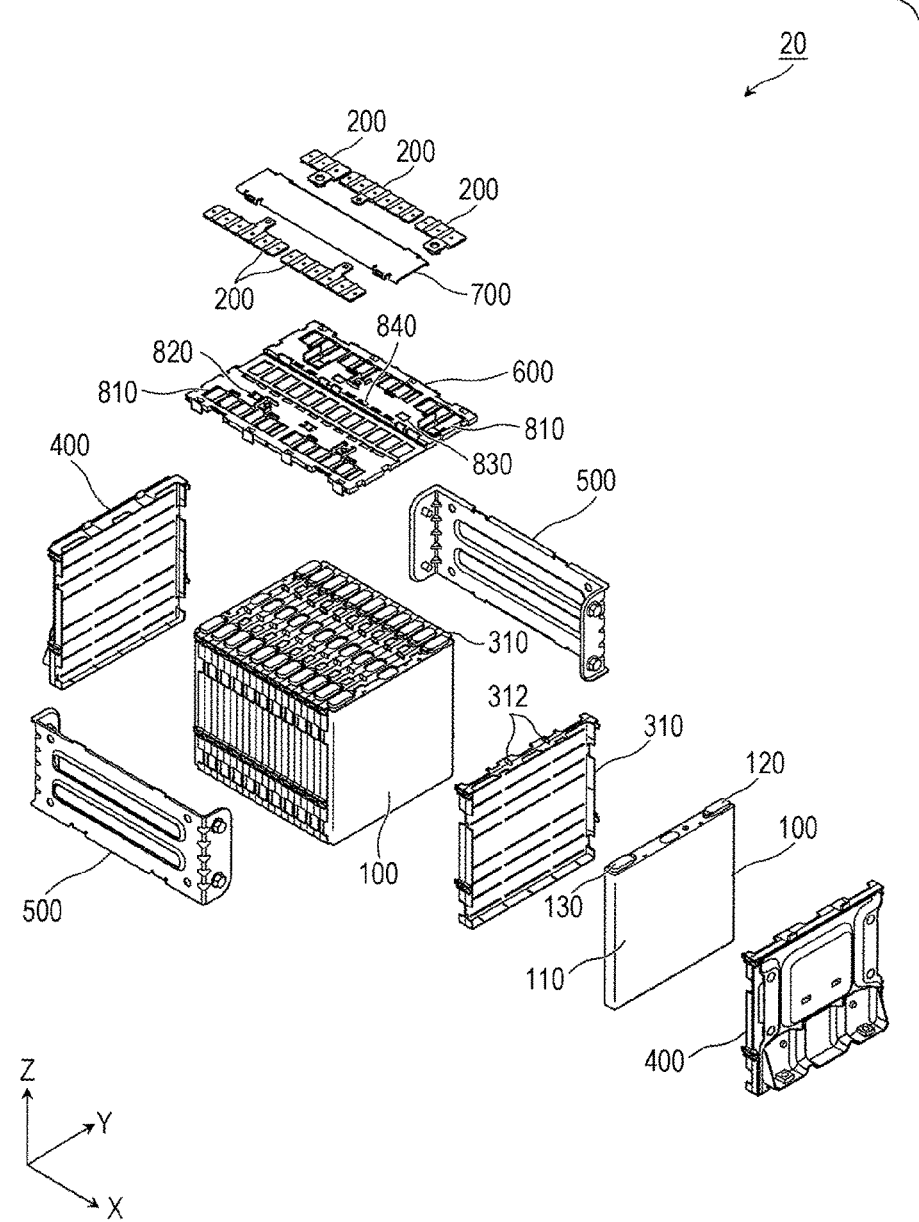
FIG. 16 is an exploded perspective view showing respective constitutional elements of an energy storage unit according to the second embodiment in a disassembled state.

FIG. 16 is an exploded perspective view showing respective constitutional elements of the energy storage unit 20 according to the second embodiment of the present invention in a disassembled state.

As shown in FIG. 16, the energy storage unit 20 includes: a plurality of energy storage devices 100; a plurality of bus bars 200; a plurality of spacers 310, a pair of sandwiching members 400; a plurality of binding members 500; a bus bar frame 600; and a heat shielding plate 700.

The energy storage device 100 is a secondary battery (single battery) which can charge or discharge electricity. To be more specific, the energy storage device 100 is a nonaqueous electrolyte secondary battery such as a lithium ion secondary battery. The energy storage device 100 has a flat rectangular shape, and is disposed adjacently to the spacer 310. That is, the plurality of energy storage devices 100 and the plurality of spacers 310 are arranged in a row in the X axis direction such that the energy storage device 100 and the spacer 310 are alternately arranged. In this embodiment, twelve energy storage devices 100 and eleven spacers 310 are arranged such that the energy storage device 100 and the spacer 310 are arranged alternately and adjacently to each other. The energy storage device 100 is not limited to a nonaqueous electrolyte secondary battery, and may be a secondary battery other than a nonaqueous electrolyte secondary battery, or may be a capacitor.

As shown in FIG. 16, the energy storage device 100 includes a container 110, a positive electrode terminal 120 and a negative electrode terminal 130. An electrode assembly (power generating element), current collectors (a positive electrode current collector and a negative electrode current collector) and the like are disposed in the inside of the container 110, and a liquid such as an electrolyte solution (nonaqueous electrolyte) is sealed in the container 110. However, the detailed description of such a configuration is omitted.

The container 110 is formed of; a bottomed housing body made of metal and having a rectangular cylindrical shape; and a metal-made lid portion which closes an opening of the housing body. The container 110 is configured such that the inside of the container 110 can be hermetically sealed by joining the lid portion and the housing body to each other by welding or the like after the electrode assembly and the like are housed in the inside of the container 110. As described above, the container 110 is a rectangular parallelepiped container having a lid portion disposed on a plus side in the Z axis direction in the drawing, long side surfaces disposed on side surfaces of the container on both sides in the X axis direction, short side surfaces disposed on side surfaces of the container on both sides in the Y axis direction, and a bottom surface disposed on a minus side in the Z axis direction. Although a material for forming the container 110 is not particularly limited, it is preferable that the container 110 be made of weldable metal such as stainless steel, aluminum or an aluminum alloy, for example.

The positive electrode terminal 120 is an electrode terminal electrically connected to a positive electrode of an electrode assembly through a positive electrode current collector. The negative electrode terminal 130 is an electrode terminal electrically connected to a negative electrode of an electrode assembly through a negative electrode current collector. Both the positive electrode terminal 120 and the negative electrode terminal 130 are mounted on the lid portion of the container 110. That is, the positive electrode terminal 120 and the negative electrode terminal 130 are metal-made electrode terminals through which electricity stored in the electrode assembly is discharged to a space outside the energy storage device 100, and through which electricity is introduced into a space inside the energy storage device 100 for storing electricity in the electrode assembly. In this embodiment, the energy storage devices 100 are disposed in a state where the positive electrode terminals 120 and the negative electrode terminals 130 are directed upward.

The bus bars 200 are bus bars electrically connected to the plurality of respective energy storage devices 100 housed in the energy storage unit 20. That is, the bus bars 200 are conductive members electrically connected to the respective electrode terminals which the plurality of energy storage devices 100 include, and the bus bars 200 electrically connect respective electrode terminals which the plurality of energy storage devices 100 have respectively to each other. To be more specific, the bus bars 200 are disposed on surfaces of the respective electrode terminals which the plurality of respective energy storage devices 100 include, and are connected (joined) to the electrode terminals.

In this embodiment, five bus bars 200 are disposed on the energy storage devices 100. Twelve energy storage devices 100 are disposed such that four sets of energy storage devices 100 each of which is formed of three energy storage devices 100 connected parallel to each other are connected in series by five bus bars 200. The bus bars 200 disposed on end portions are connected to the bus bars 41, 42 described above so that the bus bars 200 are electrically connected to the positive electrode external terminal 13 and the negative electrode external terminal 14.

The bus bars 200 are conductive members made of aluminum, for example. However, a material for forming the bus bars 200 is not particularly limited. All bus bars 200 may be made of the same material, or some bus bars 200 may be made of different materials. Further, the number of bus bars 200, the number of energy storage devices 100 which are connected to each other in parallel, the number of sets of the energy storage devices 100 which are connected to each other in series and the like are not limited to the above-mentioned configuration.

The spacer 310 is a plate-like member which is disposed on a side (the plus side or the minus side in the X axis direction) of the energy storage device 100, and provides insulation between the energy storage device 100 and other members. The spacer 310 is made of an insulating resin such as PC, PP, PE, PPS, PBT or an ABS resin, for example. That is, the spacer 310 is arranged between two energy storage devices 100 disposed adjacently to each other, and provides insulation between two energy storage devices 100. In this embodiment, twelve energy storage devices 100 and eleven spacers 310 are arranged in a row such that the spacer 310 is disposed between two energy storage devices 100 disposed adjacently to each other. The spacers 310 may be made of any material provided that the spacers 310 are made of a material having insulating property. All of the spacers 310 may be made of the same material, or any one of the spacers 310 may be made of a material different from a material for forming other spacers.

The spacer 310 is formed such that the spacer 310 covers approximately half of a front surface side or a back surface side of the energy storage device 100 (an approximately half of the front surface side or the back surface side of the energy storage device 100 when the energy storage device 100 is divided in two in the X axis direction). That is, a recessed portion is formed on both surfaces (both surfaces in the X axis direction) of the spacer 310 on the front surface side and the back surface side respectively, and an approximately half of the energy storage device 100 is inserted into each recessed portion. With such a configuration, the spacers 310 disposed on sides of the energy storage device 100 cover the most part of the energy storage device 100. Accordingly, insulating property between the energy storage devices 100 and other conductive members can be enhanced by the spacers 310. The spacer 310 is configured such that the spacer 310 does not cover a portion of the energy storage device 100 at which the thermistor 50 is positioned so as to allow the thermistor 50 to be brought into contact with the energy storage device 100.

The spacer 310 has spacer projecting portions 312 which project upward and are engageable with side engaging portions 137 of the holder 30 described later. That is, the spacer projecting portions 312 are disposed between the energy storage device 100 and the holder 30, and have a function as a second member which engages with the side engaging portions 137 which form a second engaging portion. In this embodiment, the side engaging portions 137 are one example of the second engaging portion, and the spacer projecting portions 312 are one example of the second member. The engagement between the spacer projecting portions 312 and the side engaging portions 137 is described in detail later.

The sandwiching members 400 and the binding members 500 are members which press the energy storage devices 100 from the outside in the stacking direction of the electrode assembly of the energy storage device 100. That is, the sandwiching members 400 and the binding members 500 sandwich the plurality of energy storage devices 100 from both sides in the stacking direction thus pressing each energy storage device 100 included in the plurality of respective energy storage devices 100 from both sides. The stacking direction of the electrode assembly of the energy storage devices 100 means the direction that positive electrodes, negative electrodes and separators of the electrode assembly are stacked, and is equal to the direction (X axis direction) that the plurality of energy storage devices 100 are arranged in a row. That is, the plurality of energy storage devices 100 are arranged in a row in the stacking direction.

To be more specific, the sandwiching members 400 are flat plate-like members (end plates) disposed on both sides of the unit formed of the plurality of energy storage devices 100 in the X axis direction respectively. The sandwiching members 400 hold the plurality of energy storage devices 100 and the plurality of spacers 310 by sandwiching the plurality of energy storage devices 100 and the plurality of spacers 310 from both sides in the arrangement direction (X axis direction) of the plurality of energy storage devices 100 and the plurality of spacers 310. The sandwiching member 400 is formed of a metal (conductive) material such as steel or stainless steel, for example, from a viewpoint of strength or the like of the sandwiching members 400. However, a material for forming the sandwiching member 400 is not limited to a metal material, and may be made of an insulating material having high strength, for example. When the sandwiching member 400 is made of a conductive material, to ensure insulation between the sandwiching member 400 and the energy storage device 100, a member having substantially the same insulating property as the spacer 310 is disposed between the sandwiching member 400 and the energy storage device 100.

The binding members 500 are elongated flat-plate-like members (binding bars) each of which has both ends thereof mounted on the sandwiching members 400, and bind the plurality of energy storage devices 100 to each other. That is, the binding members 500 are disposed so as to straddle over the plurality of energy storage devices 100 and the plurality of spacers 310 thus applying a binding force in the arrangement direction (X axis direction) of these members to the plurality of energy storage devices 100 and the plurality of spacers 310.

In this embodiment, two binding members 500 are disposed on both sides (both sides in the Y axis direction) of the unit formed of the plurality of energy storage devices 100, and two binding members 500 bind the plurality of energy storage devices 100 to each other by sandwiching the plurality of energy storage devices 100 from both sides. In the same manner as the sandwiching members 400, the binding members 500 are preferably made of a metal material such as steel or stainless steel, for example. However, the binding members 500 may be made of a material other than metal.

The bus bar frame 600 is a member which can provide insulation between the bus bars 200 and other members, and can regulate the positions of the bus bars 200. Particularly, the bus bar frame 600 positions the bus bars 200 with respect to the plurality of energy storage devices 100 disposed in the energy storage unit 20.

To be more specific, the bus bar frame 600 is placed on an upper side (a plus side in the Z axis direction) of the plurality of energy storage devices 100, and is positioned with respect to the plurality of energy storage devices 100. The bus bars 200 are placed on the bus bar frame 600 and are positioned. With such a configuration, the bus bars 200 are positioned with respect to the plurality of energy storage devices 100, and the bus bars 200 are bonded to electrode terminals which the plurality of respective energy storage devices 100 include through bus-bar-use opening portions 810 which are through holes formed in the bus bar frame 600.

In the bus bar frame 600, four through holes into which four thermistors 50 are inserted are formed. The four through holes are consisted of two thermistor-use opening portions 820 and two thermistor-use opening portions 830. That is, two thermistors 50 (thermistors 50a described later) are inserted into two thermistor-use opening portions 820, and remaining two thermistors 50 (thermistors 50b described later) are inserted into the two thermistor-use opening portions 830, and these four thermistors 50 are brought into contact with lid portions of containers 110 of the energy storage devices 100. Engaging-portion-use opening portions 840 into which the side engaging portions 137 of the holder 30 described later are inserted are also formed in the bus bar frame 600.

The bus bar frame 600 is disposed between the energy storage devices 100 and the holder 30, and has a function of the second member which engages with the lower engaging portions 135 which form the second engaging portion of the holder 30 described later. That is, the lower engaging portions 135 are one example of the second engaging portion, and the bus bar frame 600 is one example of the second member. The thermistor-use opening portions 820, the thermistor-use opening portions 830, and the engaging-portion-use opening portions 840 are described in detail later.

The bus bar frame 600 is made of an insulating resin material such as PC, PP, PE, PPS, PBT or an ABS resin, for example. However, the bus bar frame 600 may be made of any material provided that the bus bar frame 600 is made of a material having insulating property. In this embodiment, it is preferable that the bus bar frame 600 be made of a material having relatively high rigidity (a material having higher rigidity than holder 30) for ensuring a function of fixing the holder 30 to the energy storage devices 100.

The heat shielding plate 700 is a plate-like member having heat insulating property which is disposed in a gas discharge flow passage formed in safety valves of the energy storage devices 100. To be more specific, the heat shielding plate 700 is disposed above the bus bar frame 600 such that the heat shielding plate 700 is positioned above the safety valves of the energy storage devices 100. That is, when an abnormal state occurs such as a case where a gas is discharged from the safety valve of the energy storage device 100, the heat shielding plate 700 protects electric equipment such as a printed circuit board disposed above the energy storage unit 20 from heat of the gas. In this embodiment, the heat shielding plate 700 is made of a metal material having low thermal conductivity such as stainless steel. However, a material for forming the heat shielding plate 700 is not limited to such a metal material, and any material having high heat resistance and low thermal conductivity can be used. For example, the heat shielding plate 700 may be made of a resin such as PPS or PBT reinforced with glass fibers, ceramic or the like.

In the energy storage apparatus 1 having the above-mentioned configuration, the configuration where the thermistors 50 are mounted on the energy storage device 100 is described in detail hereinafter.

Figure 17:
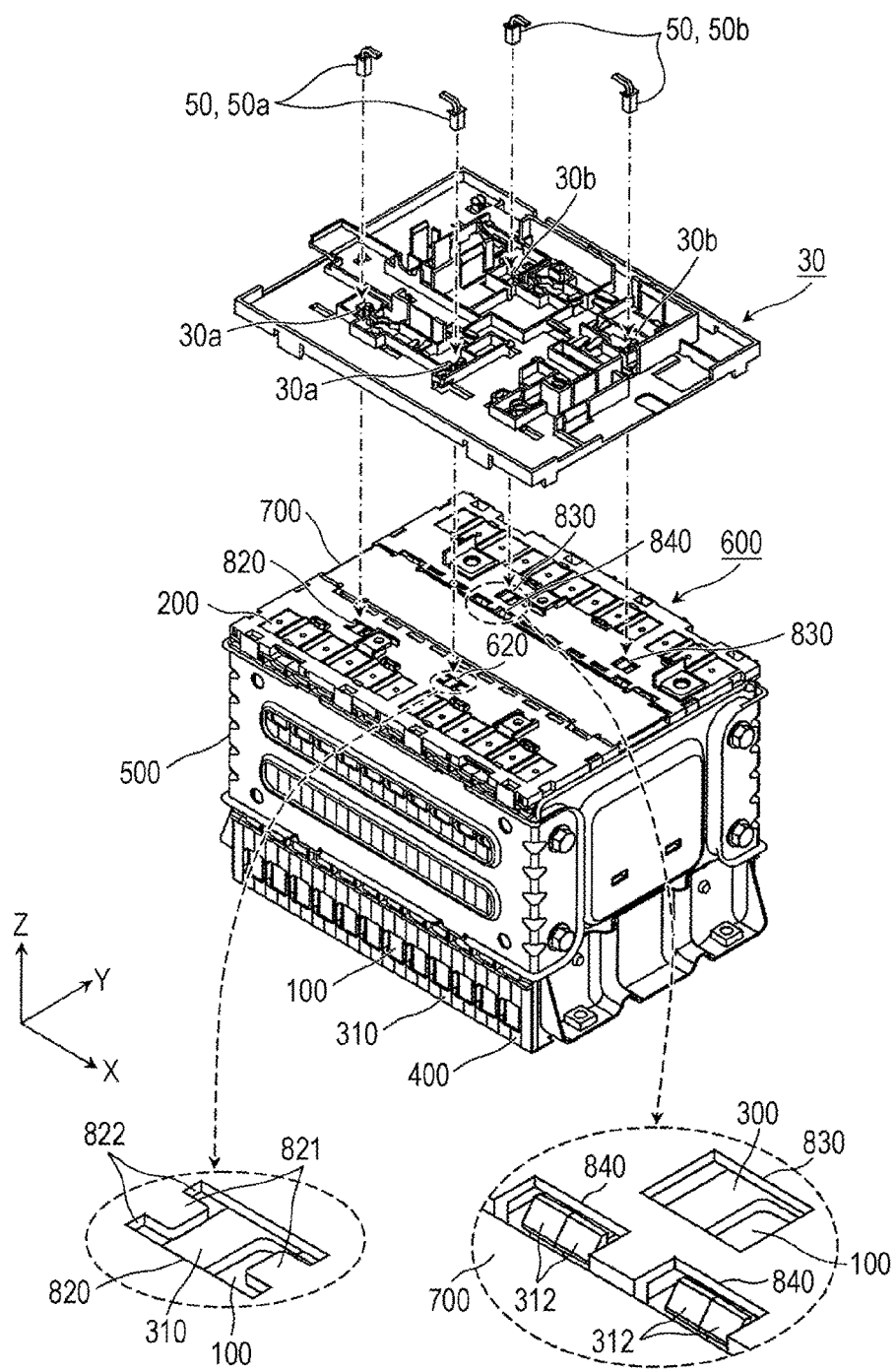
FIG. 17 is a perspective view showing the configuration where a thermistor according to the second embodiment is mounted on an energy storage device.

FIG. 17 is a perspective view showing the configuration where the thermistor 50 according to the second embodiment of the present invention is mounted on the energy storage device 100. To be more specific, FIG. 17 is a view for describing positional relationship among the energy storage devices 100, the spacers 310, the bus bar frame 600, the holder 30 and the thermistors 50.

As shown in FIG. 17, two thermistors 50 on a minus side in the Y axis direction (also referred to as thermistors 50a hereinafter) are inserted into opening portions formed in two thermistor mounting portions 30a of the holder 30 and two thermistor-use opening portions 820 formed in the bus bar frame 600, and are mounted on the energy storage device 100. The thermistor-use opening portion 820 is formed of a through hole having an approximately rectangular shape in cross section, and the thermistor-use opening portion 820 has two second biasing portions 821 which project toward the inside of the thermistor-use opening portion 820.

Two second biasing portions 821 are a pair of projecting portions which is disposed so as to oppositely face each other in the X axis direction. These second biasing portions 821 are engaged with the lower engaging portions 135 of the holder 30 as described later so as to bias the lower engaging portions 135 toward the energy storage device 100. That is, in the inside of the thermistor-use opening portion 820, two gaps 822 which respectively communicate with the opening portion into which the thermistor 50a is inserted are defined at positions which sandwich an engaging portion engageable with the lower engaging portion 135, that is, at positions which sandwich the second biasing portion 821 therebetween (both sides of the second biasing portion 821 in the Y axis direction). With such a configuration, the second biasing portions 821 bias the thermistor 50a toward the energy storage device 100. The configuration where the second biasing portions 821 bias the thermistor 50a toward the energy storage device 100 is described in detail later.

Two thermistors 50 on a plus side in the Y axis direction (also referred to as thermistors 50b) are mounted on the energy storage device 100 in a state where the thermistors 50b are inserted into opening portions formed in two thermistor mounting portions 30b of the holder 30 and two thermistor-use opening portions 830 formed in the bus bar frame 600. The thermistor-use opening portion 830 is formed of a through hole having an approximately rectangular shape in cross section.

The side engaging portion 137 of the holder 30 described later is inserted into the engaging-portion-use opening portion 840 formed in the bus bar frame 600. After being inserted into the engaging-portion-use opening portion 840, the side engaging portion 137 engages the spacer projecting portion 312 of the spacer 310. The configuration where the side engaging portion 137 engages the spacer projecting portion 312 is described in detail later.

Due to the above-mentioned configuration, the thermistors 50 (the thermistors 50a, 50b) can measure temperatures of the respective energy storage devices 100 on which the thermistors 50 are respectively mounted. The number of thermistors 50 is not limited to the number described in the above-mentioned embodiment, and is suitably decided based on the number of energy storage devices 100 whose temperatures are to be measured, temperature measuring positions of the energy storage devices 100 or the like.

Figure 18:
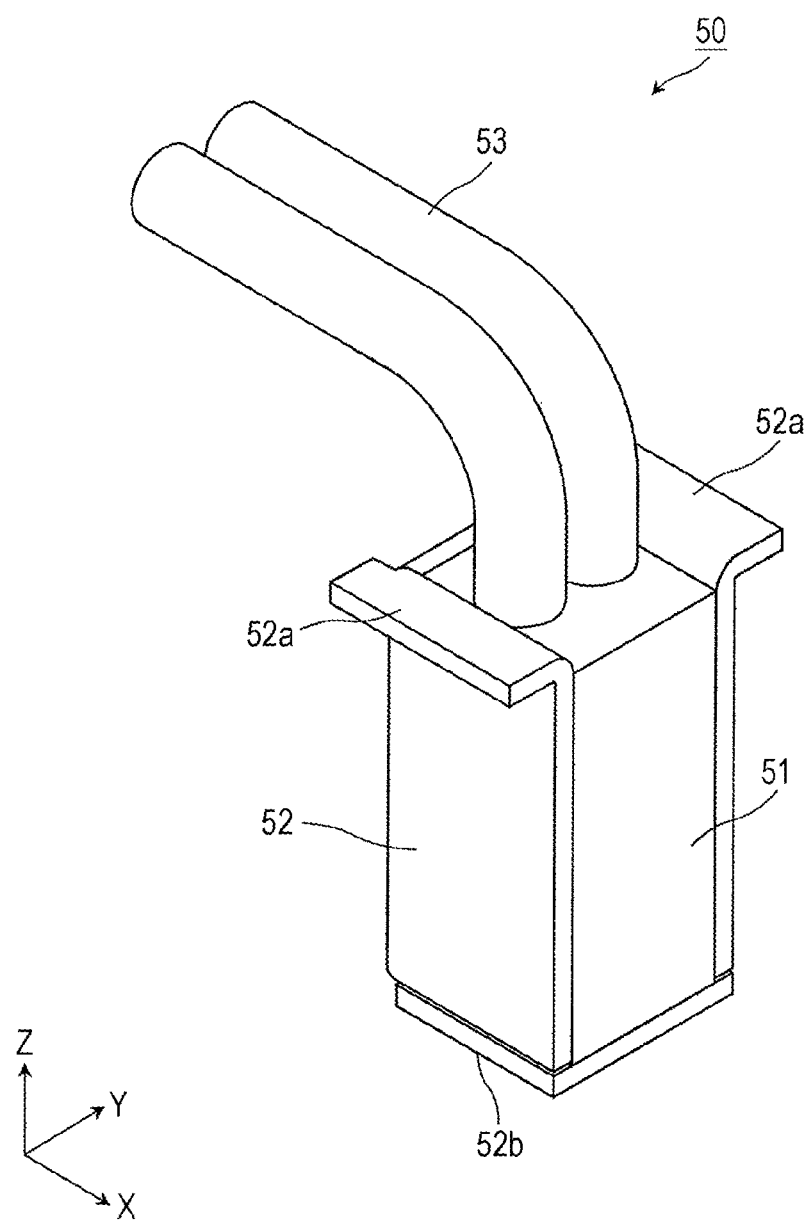
FIG. 18 is a perspective view showing the configuration of the thermistor according to the second embodiment.

Next, the configuration of the thermistor 50 and the configurations of the thermistor mounting portions 30a, 30b of the holder 30 are described in detail. First, the configuration of the thermistor 50 is described in detail. FIG. 18 is a perspective view showing the configuration of the thermistor 50 according to the second embodiment of the present invention.

As shown in FIG. 18, the thermistor 50 includes: a columnar portion 51 which forms a body of the thermistor 50; and a cover member 52 which covers the columnar portion 51. Lead lines 53 are connected to an upper portion of the columnar portion 51.

The columnar portion 51 is an angular columnar portion which incorporates a thermistor element body therein. To be more specific, an outer shell of the columnar portion 51 is formed using aluminum, for example, the thermistor element body is housed in the inside of the columnar portion 51, and a resin is filled in the inside of the columnar portion 51 so that the thermistor element body is embedded in the resin. A shape of the columnar portion 51 is not limited to an angular columnar shape, and may have a circular columnar shape, a conical shape, a pyramid shape or the like. A method of housing the thermistor element body in the inside of the columnar portion 51 is not also limited, and the conventional configurations are suitably selected.

The lead lines 53 are connected to the thermistor element body in the inside of the columnar portion 51, and extend in a projecting manner from an upper portion of the columnar portion 51. That is, the lead lines 53 are cables having one ends thereof connected to the columnar portion 51 and having the other ends thereof connected to a printed circuit board disposed in the inside of the first outer covering 11. The lead lines 53 transmit a resistance value of the thermistor element body to the printed circuit board. That is, the thermistor element body is an electric resistance element whose resistance value changes corresponding to a temperature. A resistance value of the thermistor element body which corresponds to a temperature of the energy storage device 100 is transmitted to the printed circuit board, and the printed circuit board converts the acquired resistance value into a temperature. In the drawing, the configuration where one ends of the lead lines 53 are connected to the columnar portion 51 is shown and the configuration where the other ends of the lead lines 53 are connected to the printed circuit board is omitted. However, the other ends may be directly connected to the printed circuit board, and may be connected to the printed circuit board via other wirings.

The cover member 52 is a rectangular-shaped member which covers four surfaces (a surface on a minus side in the X axis direction, surfaces on both sides in the Y axis direction, a surface on a minus side in the Z axis direction) of the columnar portion 51, and is provided as a cover which protects the columnar portion 51. The cover member 52 is made of aluminum or the like, for example. The cover member 52 has: a pair of flat-plate-like thermistor projecting portions 52a which projects outward (both sides in the Y axis direction) on an upper portion thereof; and a bottom surface portion 52b which covers a lower surface (the surface in a minus side in the Z axis direction) of the columnar portion 51 on a lower portion thereof.

The shape of the thermistor projecting portions 52a and the number of the thermistor projecting portions 52a are not limited to those of the above-mentioned embodiment. In this embodiment, the thermistor projecting portions 52a are integrally formed with the cover member 52. However, the thermistor projecting portions 52a may be formed as members separate from the cover member 52.

Figure 19A:
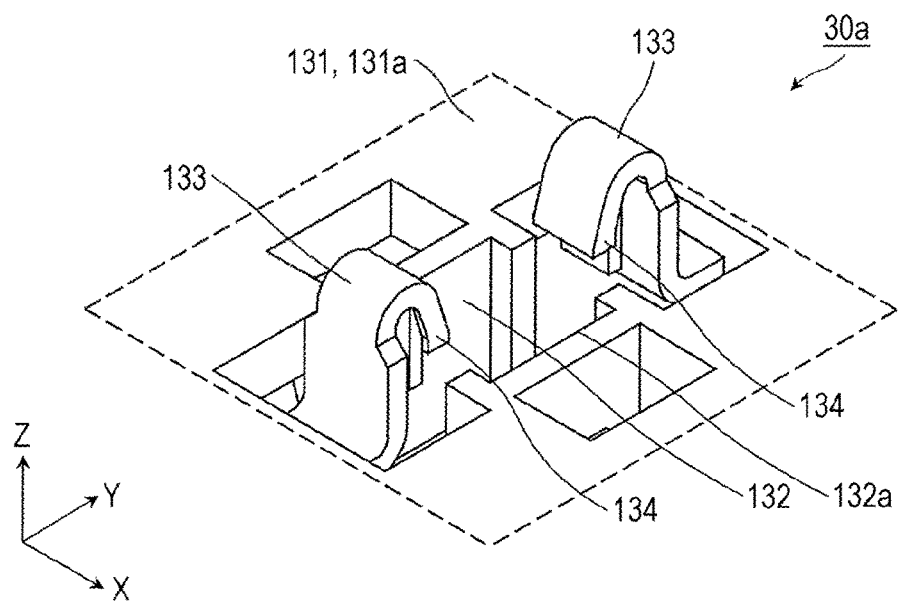
FIG. 19A is an enlarged perspective view showing the configuration of a thermistor mounting portion of a holder according to the second embodiment in an enlarged manner.
Figure 19B:
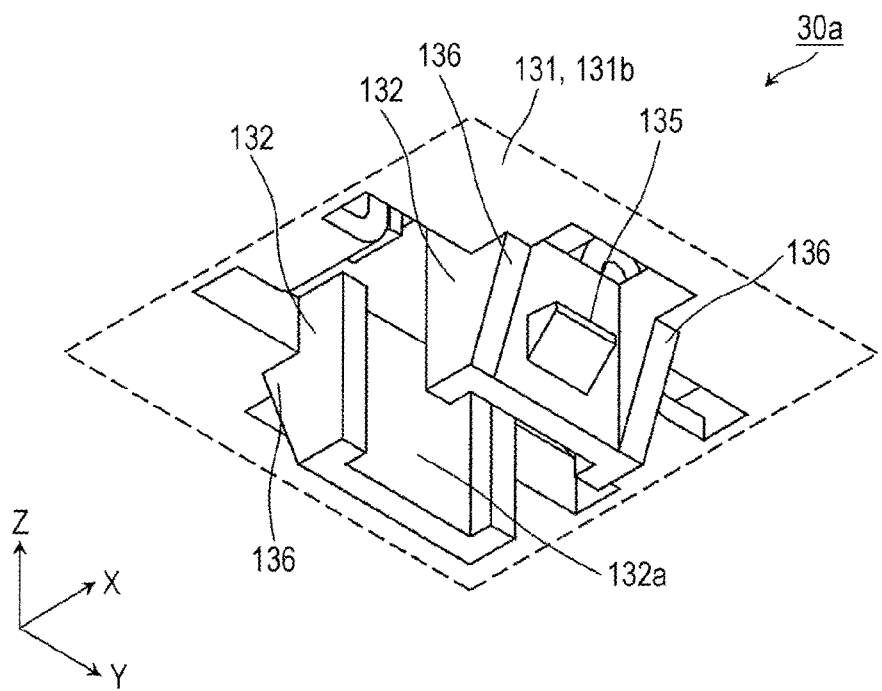
FIG. 19B is an enlarged perspective view showing the configuration of the thermistor mounting portion of the holder according to the second embodiment in an enlarged manner.

Next, the configuration of the thermistor mounting portion 30a of the holder 30 is described in detail. FIG. 19A and FIG. 19B are enlarged perspective views showing the configuration of the thermistor mounting portion 30a of the holder 30 according to the second embodiment of the present invention in an enlarged manner. To be more specific, FIG. 19A is an enlarged perspective view of the thermistor mounting portion 30a shown in FIG. 17 as viewed from above, and FIG. 19B is an enlarged perspective view of the thermistor mounting portion 30a as viewed from below.

As shown in these drawings, the thermistor mounting portion 30a of the holder 30 includes: a body portion 131; a sensor inserting portion 132; first biasing portions 133; and upper engaging portions 134. In this embodiment, the body portion 131, the sensor inserting portion 132, the first biasing portions 133 and the upper engaging portions 134 are formed as an integral body. However, any of these portions may be formed as members separate from the body portion 131.

The body portion 131 is a portion which forms a base of the thermistor mounting portion 30a, and is a flat-plate-like portion having an upper surface 131a on a plus side in the Z axis direction and having a lower surface 131b on a minus side in the Z axis direction.

The sensor inserting portion 132 is a portion into which the thermistor 50 is inserted. The sensor inserting portion 132 is a portion having an approximately angular cylindrical shape which penetrates the body portion 131 and is formed in a downwardly projecting manner from the lower surface 131b of the body portion 131. That is, a rectangular opening portion 132a into which the thermistor 50 is inserted is formed in the sensor inserting portion 132.

The opening portion 132a is a portion which forms an insertion passage into which the thermistor 50 is inserted, and is a portion formed of an inner wall surface of the sensor inserting portion 132 which surrounds the insertion passage. The opening portion 132a has a shape which corresponds to an outer shape of the cover member 52 of the thermistor 50 (a shape slightly larger than an outer shape of the cover member 52) from an upper end to a lower end of the sensor inserting portion 132. It is sufficient that the opening portion 132a has a shape which allows the insertion (passing) of the thermistor 50, and the opening portion 132a is not limited to the above-mentioned shape.

The sensor inserting portion 132 includes: lower engaging portions 135 and side projecting portions 136. In this embodiment, the lower engaging portions 135 and the side projecting portions 136 are formed integrally with the sensor inserting portion 132. However, the lower engaging portions 135 and the side projecting portions 136 may be formed as members separate from the sensor inserting portion 132.

The lower engaging portions 135 are projecting portions which project from sides of the sensor inserting portion 132, are disposed between the energy storage device 100 and the bus bar frame 600, and are engaged with the bus bar frame 600. To be more specific, the lower engaging portions 135 are a pair of triangular-columnar-shaped projecting portions which project outward from center portions of side surfaces of the sensor inserting portion 132 on both sides in the X axis direction, and upper surfaces of the lower engaging portions 135 are formed of an approximately horizontal surface. With such a configuration, the lower engaging portions 135 engage with the bus bar frame 600. The configuration where the lower engaging portions 135 engage with the bus bar frame 600 is described in detail later.

The side projecting portions 136 are projecting portions which project from both sides of each of the lower engaging portions 135. To be more specific, the side projecting portions 136 are formed of two pairs of triangular columnar-shaped projecting portions which project outward from both ends in the Y axis direction of both side surfaces of the sensor inserting portion 132 in the X axis direction. When the sensor inserting portion 132 is inserted into the thermistor-use opening portion 820 of the bus bar frame 600, the side projecting portions 136 are inserted into the gaps 822 formed on both sides of the second biasing portion 821 of the bus bar frame 600.

The upper engaging portions 134 are portions which engage with the thermistor 50. To be more specific, the upper engaging portions 134 are disposed at the position where the upper engaging portions 134 sandwiches the thermistor 50 in cooperation with the energy storage device 100, and engage with the thermistor 50. That is, the upper engaging portions 134 are plate-like portions which are formed on distal end portions of the first biasing portions 133, engage with the upper surface of the thermistor 50 (upper surfaces of the thermistor projecting portions 52a), and sandwich the thermistor 50 in cooperation with the energy storage device 100 as a whole. The upper engaging portions 134 are one example of the first engaging portion.

The first biasing portions 133 are portions which bias the thermistor 50 toward the energy storage device 100, and are disposed in a state where the first biasing portions 133 are connected to the upper engaging portions 134. To be more specific, the first biasing portions 133 are plate-like portions which extend from the body portion 131 to the upper engaging portions 134 in a bent shape, wherein one ends of the first biasing portions 133 are connected to the body portion 131, and the other ends of the first biasing portions 133 are connected to the upper engaging portions 134. That is, the first biasing portions 133 extend toward the sensor inserting portion 132 from the body portion 131, and extend upward (toward a plus side in the Z axis direction) in a bent shape and, further, extend downward (toward a minus side in the Z axis direction) in a bent shape thus forming an inverted U shape. With such a configuration, the first biasing portions 133 become portions having resiliency. That is, the first biasing portions 133 apply a biasing force which pushes and returns the thermistor 50 downward when the thermistor 50 is inserted into the sensor inserting portion 132 and is moved upward.

Figure 20A:
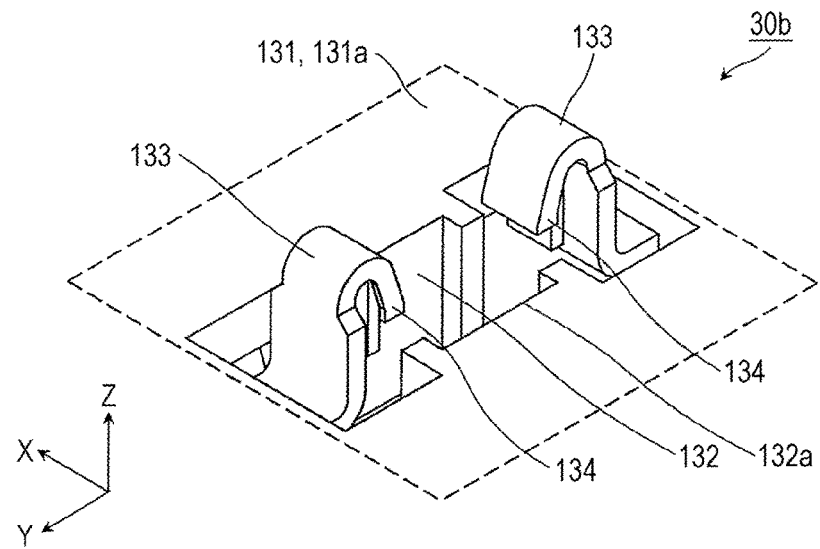
FIG. 20A is an enlarged perspective view showing the configuration of the thermistor mounting portion of the holder according to the second embodiment in an enlarged manner.
Figure 20B:
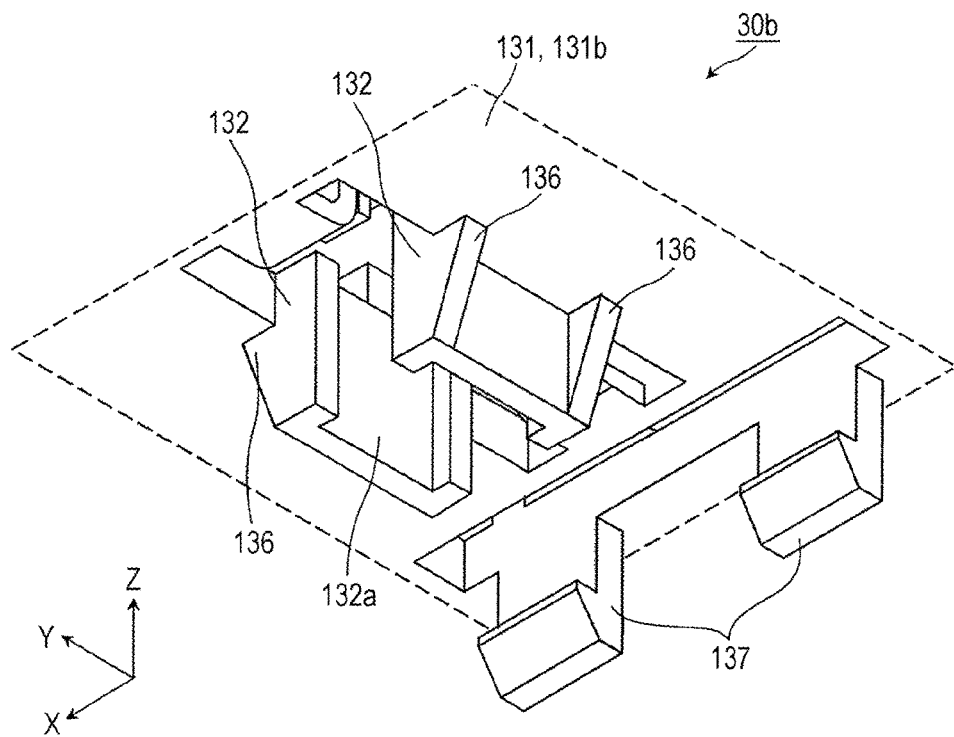
FIG. 20B is an enlarged perspective view showing the configuration of the thermistor mounting portion of the holder according to the second embodiment in an enlarged manner.

Next, the configuration of the thermistor mounting portion 30b of the holder 30 is described in detail. FIG. 20A and FIG. 20B are enlarged perspective views showing the configuration of the thermistor mounting portion 30b of the holder 30 according to the second embodiment of the present invention in an enlarged manner. To be more specific, FIG. 20A is an enlarged perspective view of the thermistor mounting portion 30b shown in FIG. 17 as viewed from above, and FIG. 20B is an enlarged perspective view of the thermistor mounting portion 30b as viewed from below.

As shown in these drawings, the thermistor mounting portion 30b includes side engaging portions 137 in place of the lower engaging portions 135 which the sensor inserting portion 132 of the above-mentioned thermistor mounting portion 30a includes. Other configurations of the thermistor mounting portion 30b are substantially equal to the corresponding configurations of the thermistor mounting portion 30a and hence, the detailed description of the other configurations is omitted.

The side engaging portions 137 are projecting portions which are disposed on the side of the sensor inserting portion 132 and project downward from the body portion 131. The side engaging portions 137 are disposed between the energy storage device 100 and the bus bar frame 600 and engage with the spacer 310. In this embodiment, the side engaging portions 137 are formed integrally with the body portion 131. However, the side engaging portions 137 may be formed as members separate from the body portion 131.

To be more specific, the side engaging portions 137 are a pair of projecting portions which projects downward (toward a minus side in the Z axis direction) from the lower surface 131b of the body portion 131. Distal end portions of the side engaging portions 137 are formed of portions having an approximately triangular column shape and projecting toward a plus side in the Y axis direction, and upper surfaces of the distal end portions form approximately horizontal surfaces. With such a configuration, the upper surfaces of the side engaging portions 137 engage with the spacer projecting portions 312 of the spacer 310. The configuration where the side engaging portions 137 engage with the spacer projecting portions 312 is described in detail later.

Next, a method of mounting the thermistors 50 (the thermistors 50a, 50b) on the energy storage devices 100 at the time of manufacturing the energy storage apparatus 1 is described in detail.

Figure 21:
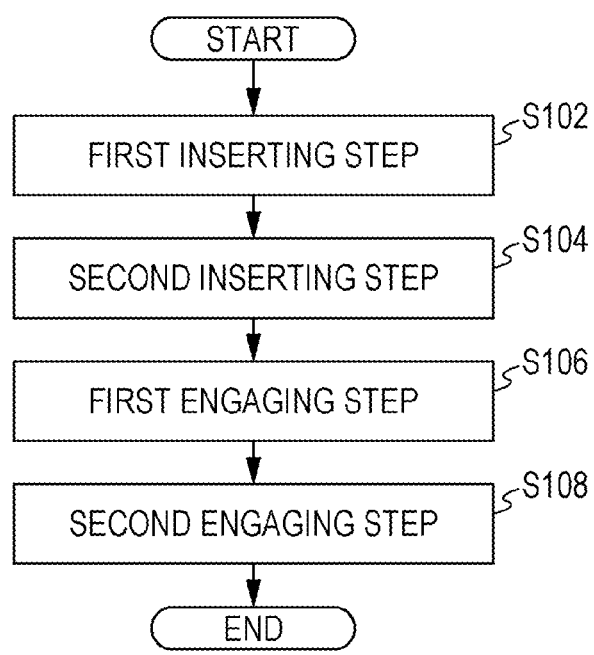
FIG. 21 is a flowchart showing a method of manufacturing the energy storage apparatus according to the second embodiment.

FIG. 21 is a flowchart showing a method of manufacturing the energy storage apparatus 1 according to the second embodiment of the present invention. To be more specific, FIG. 21 is a flowchart showing a method of mounting the thermistors 50 on the energy storage devices 100 in the method of manufacturing the energy storage apparatus 1.

As shown in the drawing, first, as a first inserting step, the thermistors 50 are inserted into the opening portions 132a of the thermistor mounting portions 30a of the holder 30 (S102). The first inserting step is described in detail hereinafter.

Figure 22A:
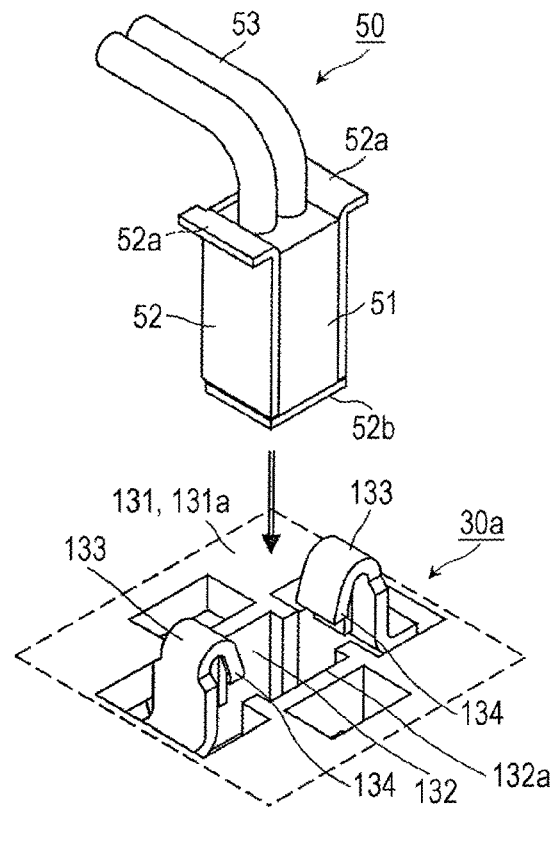
FIGS. 22A-22B are perspective views showing a first inserting step where the thermistor according to the second embodiment is inserted into an opening portion of the thermistor mounting portion of the holder.
Figure 22B:
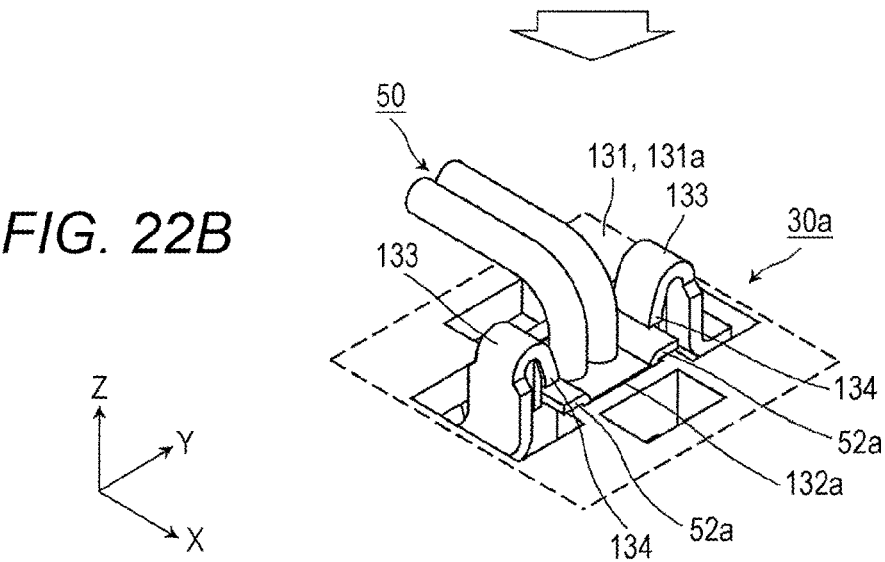

FIGS. 22A-22B are perspective views showing the first inserting step where the thermistor 50 (thermistor 50a) according to the second embodiment of the present invention is inserted into the opening portion 132a of the thermistor mounting portion 30a of the holder 30. To be more specific, FIG. 22A is a perspective view showing a state before the thermistor 50 is inserted into the opening portion 132a of the thermistor mounting portion 30a, and FIG. 22B is a perspective view showing a state after the thermistor 50 is inserted into the opening portion 132a of the thermistor mounting portion 30a.

FIGS. 23A-23B are cross-sectional views showing the first inserting step where the thermistor 50 (the thermistor 50a) according to the second embodiment of the present invention is inserted into the opening portion 132a of the thermistor mounting portion 30a of the holder 30. To be more specific, FIG. 23A is a view showing the first inserting step in cross section taken along a plane including a center axis of the thermistor mounting portion 30a and being parallel to the Y-Z plane. Further, FIG. 23B is a view showing the first inserting step in cross section taken along a plane including the center axis of the thermistor mounting portion 30a and being parallel to the X-Z plane.

As shown in these drawings, in the first inserting step, the thermistor 50 is disposed in a direction which intersects with the holder 30, and the cover member 52 of the thermistor 50 is inserted along the opening portion 132a of the sensor inserting portion 132 from above the thermistor mounting portion 30a of the holder 30.

To be more specific, first, when the cover member 52 of the thermistor 50 is inserted into the opening portion 132a of the sensor inserting portion 132, the pair of thermistor projecting portions 52a of the thermistor 50 is disposed between the pair of upper engaging portions 134 of the holder 30. Then, when the thermistor 50 is further inserted by pushing, the holder 30 is resiliently deformed such that the pair of upper engaging portions 134 moves away from each other, and the pair of thermistor projecting portions 52a moves downward. With such an operation, the pair of thermistor projecting portions 52a moves to spaces formed between the pair of upper engaging portions 134 and the sensor inserting portion 132 and is placed on the sensor inserting portion 132.

Returning to FIG. 21, next, in a second inserting step, the thermistor 50 and the holder 30 are inserted into the thermistor-use opening portion 820 of the bus bar frame 600 (S104). The second inserting step is described in detail hereinafter.

FIGS. 24A-24B are cross-sectional views showing the second inserting step where the thermistor 50 (thermistor 50a) and the holder 30 according to the second embodiment of the present invention are inserted into the thermistor-use opening portion 820 formed in the bus bar frame 600. To be more specific, FIG. 24A is a view showing the second inserting step in cross section taken along a plane including a center axis of the thermistor mounting portion 30a and being parallel to the Y-Z plane. FIG. 24B is a view showing the second inserting step in cross section taken along a plane including the center axis of the thermistor mounting portion 30a and being parallel to the X-Z plane.

As shown in FIGS. 24A-24B, in the second inserting step, in a state where the thermistor 50 is inserted into the opening portion 132a of the thermistor mounting portion 30a of the holder 30, the thermistor 50 and the holder 30 are inserted along the thermistor-use opening portion 820 of the bus bar frame 600 from above the bus bar frame 600.

To be more specific, when the cover member 52 of the thermistor 50 and the sensor inserting portion 132 of the holder 30 are inserted into the thermistor-use opening portion 820, lower portions of the lower engaging portions 135 of the sensor inserting portion 132 are brought into contact with upper portions of the second biasing portions 821 of the bus bar frame 600.

Returning to FIG. 21, next, in a first engaging step, the upper engaging portions 134 of the holder 30 are made to engage with the thermistor 50 (S106). The first engaging step is described in detail hereinafter.

FIGS. 25A-25B are cross-sectional views showing the first engaging step where the upper engaging portions 134 of the holder 30 according to the second embodiment of the present invention are made to engage with the thermistor 50 (thermistor 50a). To be more specific, FIG. 25A is a view showing the first engaging step in cross section taken along a plane including the center axis of the thermistor mounting portion 30a and being parallel to the Y-Z plane. Further, FIG. 25B is a view showing the first engaging step in cross section taken along a plane including the center axis of the thermistor mounting portion 30a and being parallel to the X-Z plane.

As shown in FIGS. 25A-25B, in the first engaging step, by further inserting the thermistor 50 and the holder 30 into the thermistor-use opening portion 820 of the bus bar frame 600, the upper engaging portions 134 of the holder 30 are made to engage with the thermistor 50.

To be more specific, the cover member 52 of the thermistor 50 and the sensor inserting portion 132 of the holder 30 are further inserted along the thermistor-use opening portion 820 from a state shown in FIGS. 24A-24B. With such an insertion, since the lower engaging portions 135 of the sensor inserting portion 132 are brought into contact with the second biasing portion 821, the lower engaging portions 135 push the distal end portion of the second biasing portion 821 downward and, at the same time, the sensor inserting portion 132 is lifted up with respect to the holder 30. With such an operation, the pair of thermistor projecting portions 52a of the thermistor 50 engages with the upper engaging portions 134 of the holder 30.

Here, two gaps 822 which communicate with the opening portion into which the thermistor 50 is inserted are disposed inside the thermistor-use opening portion 820 at positions which sandwich the engaging portion of the second biasing portion 821 (a distal end portion of the second biasing portion 821) which engages with the lower engaging portion 135. With such a configuration, the distal end portions of the second biasing portions 821 is easily pushed downward by the lower engaging portions 135.

Returning to FIG. 21, next, in a second engaging step, the upper engaging portions 134 of the holder 30 are made to engage with the thermistor 50 (S108). The second engaging step is described in detail hereinafter.

Figure 26A:
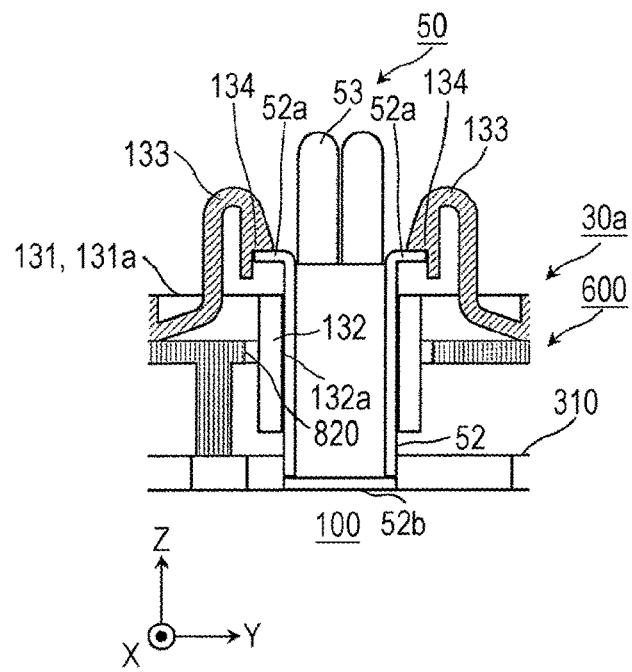
FIGS. 26A-26B are cross-sectional views showing a second engaging step where a lower engaging portion of the holder according to the second embodiment is locked to the bus bar frame.
Figure 26B:
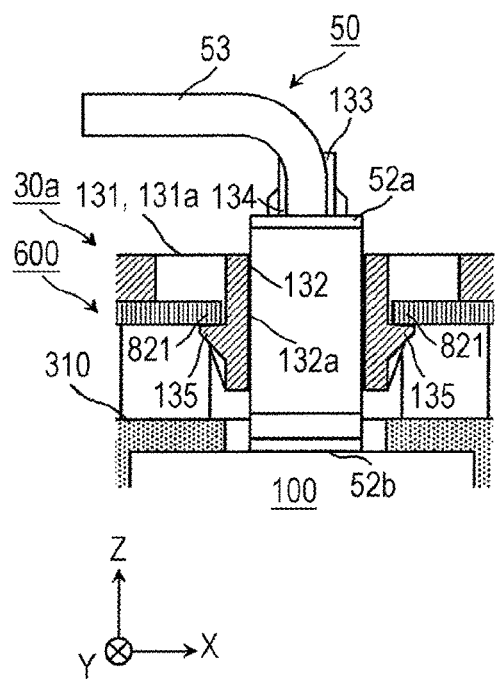

FIGS. 26A-26B are cross-sectional views showing the second engaging step where the lower engaging portions 135 of the holder 30 according to the second embodiment of the present invention are made to engage with the bus bar frame 600. To be more specific, FIG. 26A is a view showing the second engaging step in cross section taken along a plane including the center axis of the thermistor mounting portion 30a and being parallel to the Y-Z plane. Further, FIG. 26B is a view showing the second engaging step in cross section taken along a plane including the center axis of the thermistor mounting portion 30a and being parallel to the X-Z plane.

As shown in FIGS. 26A-26B, in the second engaging step, by further inserting the thermistor 50 and the holder 30 into the thermistor-use opening portion 820 of the bus bar frame 600, the lower engaging portions 135 of the holder 30 are made to engage with the bus bar frame 600.

To be more specific, the cover member 52 of the thermistor 50 and the sensor inserting portion 132 of the holder 30 are further inserted along the thermistor-use opening portion 820 from a state shown in FIGS. 25A-25B. With such an insertion, the lower engaging portions 135 of the sensor inserting portion 132 enter spaces below the second biasing portions 821 of the bus bar frame 600, and upper surfaces of the lower engaging portion 135 and lower surfaces of the second biasing portions 821 are made to engage with each other.

That is, since the energy storage device 100 is disposed below the bus bar frame 600, the lower engaging portions 135 are disposed between the energy storage device 100 and the bus bar frame 600, and the lower engaging portions 135 engage with the bus bar frame 600. With such a configuration, even when the holder 30 intends to move upward, the holder 30 is biased toward the energy storage device 100 by the second biasing portions 821 of the bus bar frame 600 and hence, an upward movement of the holder 30 is suppressed.

At this stage of operation, the thermistor 50 is brought into a state where the thermistor projecting portions 52a of the thermistor 50 engages with the upper engaging portions 134 of the holder 30. The thermistor 50 is also brought into a state where the thermistor 50 is biased toward the energy storage device 100 by the first biasing portions 133 of the holder 30. Accordingly, the bottom surface portion 52b of the cover member 52 of the thermistor 50 is pressed to the upper surface of the energy storage device 100. That is, the upper engaging portions 134 engage with the upper surfaces of the thermistor projecting portions 52a and sandwich the thermistor 50 as a whole in cooperation with the energy storage device 100. With such a configuration, the thermistor 50 can be mounted on the energy storage device 100.

In the above-mentioned description, the method of mounting the thermistor 50 on the energy storage device 100 is described by taking the case where the thermistor 50a is mounted on the energy storage device 100 as an example. However, the method of mounting the thermistor 50b on the energy storage device 100 slightly differs from the method of mounting the thermistor 50a on the energy storage device 100. Accordingly, the method of mounting the thermistor 50b on the energy storage device 100 is described mainly on the contents which differs from the corresponding contents of the method of mounting the thermistor 50a on the energy storage device 100.

Figure 27A:
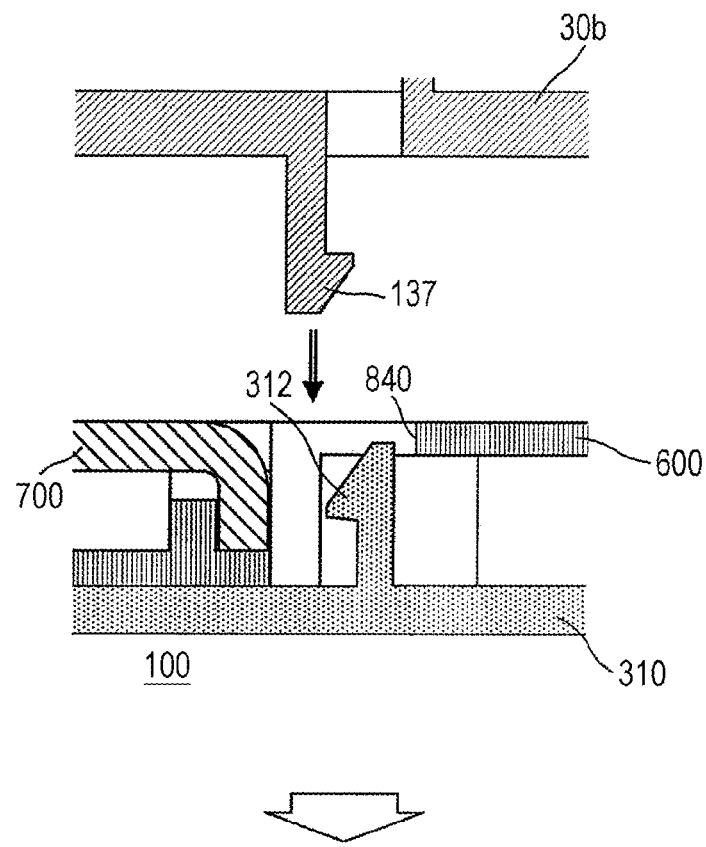
FIGS. 27A-27B are cross-sectional views showing a step of engaging a side engaging portion of the holder according to the second embodiment with a spacer projecting portion of the spacer.
Figure 27B:
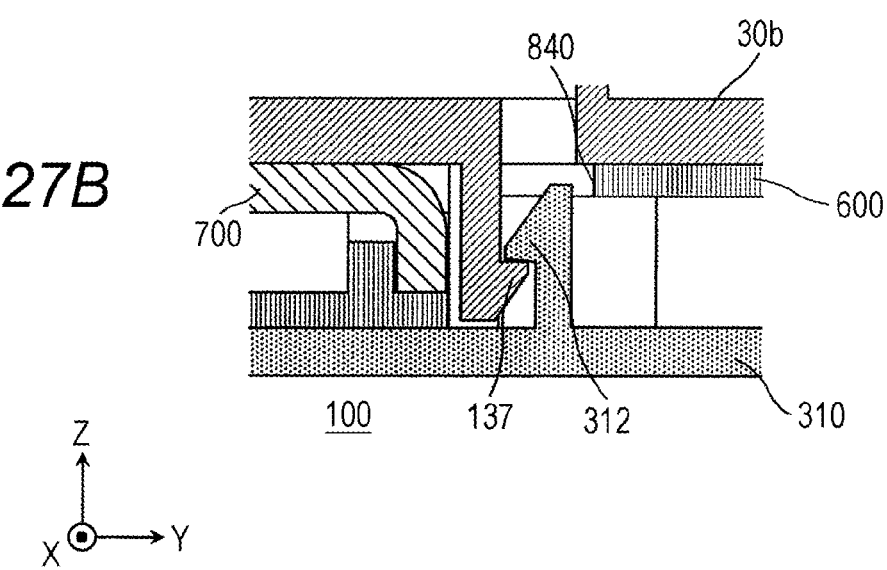

FIGS. 27A-27B are cross-sectional views showing a step where the side engaging portion 137 of the holder 30 according to the second embodiment of the present invention is made to engage with the spacer projecting portion 312 of the spacer 310. This step corresponds to the second engaging step in FIG. 21.

That is, in the same manner as the first inserting step of the method of mounting the thermistor 50a, the method of mounting the thermistor 50b also includes a first inserting step where the thermistor 50b is inserted into the opening portion 132a of the thermistor mounting portion 30b of the holder 30. Further, in the same manner as the second inserting step in the method of mounting the thermistor 50*a*, the method of mounting the thermistor 50*b* also includes a second inserting step where the thermistor 50*b* and the holder 30 are inserted into the thermistor-use opening portion 830 of the bus bar frame 600. Further, in the same manner as the first engaging step in the method of mounting the thermistor 50*a*, the method of mounting the thermistor 50*b* also includes a first engaging step where the upper engaging portions 134 of the thermistor mounting portion 30*b* is made to engage with the thermistor 50*b*.

In the second engaging step of the method of mounting the thermistor 50*b*, as shown in FIGS. 27A-27B, the side engaging portion 137 of the holder 30 is inserted into the engaging-portion-use opening portion 840 of the bus bar frame 600, and the inserted side engaging portion 137 is made to engage with the spacer projecting portion 312 of the spacer 310. To be more specific, the spacer projecting portion 312 is disposed between the energy storage device 100 and the holder 30, and a lower surface of the spacer projecting portion 312 is made to engage with an upper surface of the side engaging portion 137. With such a configuration, even when the holder 30 intends to move upward, the upward movement of the holder 30 is suppressed by the spacer projecting portion 312 of the spacer 310.

In the same manner as the method of mounting the thermistor 50*a*, the upper engaging portion 134 of the holder 30 is disposed at a position where the upper engaging portion 134 sandwiches the thermistor 50*b* in cooperation with the energy storage device 100 so that the upper engaging portion 134 of the holder 30 is made to engage with the thermistor 50*b* and, at the same time, the thermistor 50*b* is biased toward the energy storage device 100 by the first biasing portions 133 of the holder 30. With such a configuration, the thermistor 50*b* can be mounted on the energy storage device 100.

As has been descried heretofore, according to the energy storage apparatus 1 of the second embodiment of the present invention, the holder 30 as the first member which opposedly faces the energy storage device 100 includes: the upper engaging portions 134 as the first engaging portion which are disposed at a position where the upper engaging portions 134 sandwich the thermistor 50 in cooperation with the energy storage device 100 and engage with the thermistor 50; and the first biasing portions 133 which are connected to the upper engaging portions 134 and bias the thermistor 50 toward the energy storage device 100. With such a configuration, the holder 30 engages with the thermistor 50 such that the holder 30 sandwiches the thermistor 50 in cooperation with the energy storage device 100, and the holder 30 biases the thermistor 50 toward the energy storage device 100. Accordingly, it is possible to easily mount the thermistor 50 on the energy storage device 100 without making the thermistor 50 have the complicated structure.

The upper engaging portions 134 engage with the upper surface of the thermistor 50 and hence, the thermistor 50 can be formed into a simple shape.

The holder 30 has the sensor inserting portion 132 into which the thermistor 50 is inserted and hence, the thermistor 50 can be easily mounted on the energy storage device 100 by performing a simple operation of inserting the thermistor 50 into the sensor inserting portion 132.

Further, in the case of mounting the thermistor 50*a*, the sensor inserting portion 132 includes the lower engaging portions 135 as the second engaging portion which engage with the bus bar frame 600 between the bus bar frame 600 as the second member and the energy storage device 100.

Due to the engagement of the lower engaging portions 135 with the bus bar frame 600, coming off of the holder 30 can be suppressed. Particularly, since the sensor inserting portion 132 has the lower engaging portions 135, the lower engaging portions 135 are disposed in the vicinity of the thermistor 50 and hence, it is possible to effectively suppress coming off of the holder 30 which may be caused by the thermistor 50.

The lower engaging portion 135 are the projecting portions which project from the side of the sensor inserting portion 132 and hence, the lower engaging portions 135 can be easily made to engage with the bus bar frame 600.

By biasing the lower engaging portions 135 toward the energy storage device 100 by the second biasing portions 821 which the bus bar frame 600 includes, it is possible to suppress coming off of the holder 30.

The bus bar frame 600 has two gaps 822 at positions which sandwich the engaging portion of the bus bar frame 600 with the lower engaging portion 135 and hence, in mounting the holder 30 on the bus bar frame 600, the engaging portions of the bus bar frame 600 can be made to engage with the lower engaging portions 135 by resiliently deforming the engaging portions of the bus bar frame 600.

In the case of mounting the thermistor 50*b*, the sensor inserting portion 132 has the side engaging portions 137 as the second engaging portion which engage with the spacer projecting portion 312 between the spacer projecting portion 312 as the second member and the energy storage device 100. Accordingly, due to the engagement of the side engaging portions 137 with the spacer projecting portion 312, it is possible to suppress coming off of the holder 30.

According to the method of manufacturing the energy storage apparatus 1 of the second embodiment of the present invention, the upper engaging portions 134 of the holder 30 which opposedly face the energy storage device 100 are disposed at the position where the upper engaging portions 134 sandwich the thermistor 50 in cooperation with the energy storage device 100 and are made to engage with the thermistor 50 and, at the same time, the thermistor 50 is biased toward the energy storage device 100 by the first biasing portions 133 of the holder 30. With such a configuration, the holder 30 engages with the thermistor 50 such that the holder 30 sandwiches the thermistor 50 in cooperation with the energy storage device 100, and biases the thermistor 50 toward the energy storage device 100 and hence, it is possible to easily mount the thermistor 50 on the energy storage device 100 without making the thermistor 50 have the complicated structure.

(Modification 1)

Next, a modification 1 of the above-mentioned second embodiment is described. In the second embodiment, the thermistor 50 (thermistor 50*a*, 50*b*) has the angular columnar-shaped cover member 52. However, in this modification, the thermistor 50 has a circular columnar-shaped cover member.

Figure 28A:
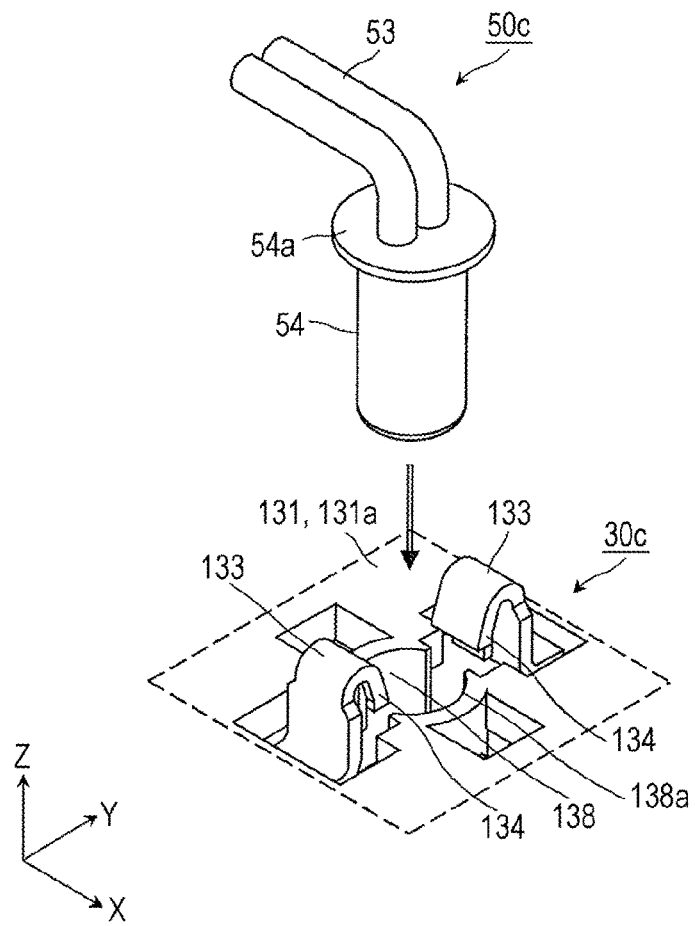
FIG. 28A is a perspective view showing the configuration of a thermistor and a thermistor mounting portion of a holder according to a modification 1 of the second embodiment.
Figure 28B:
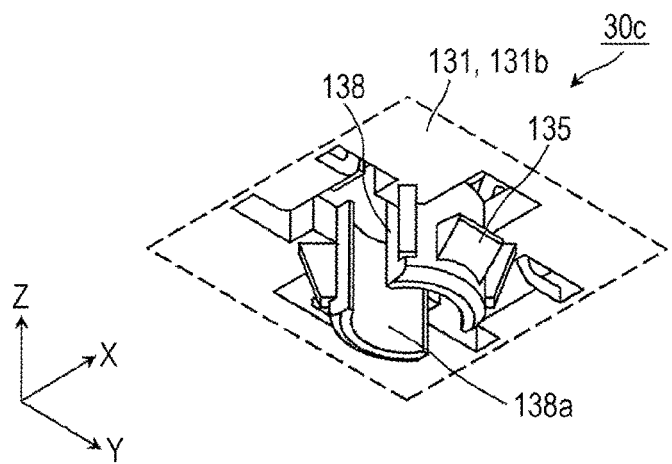
FIG. 28B is an enlarged perspective view when the thermistor mounting portion of the holder according to the modification 1 of the second embodiment is viewed from below.

FIG. 28A is a perspective view showing the configuration of a thermistor 50*c* and a thermistor mounting portion 30*c* of a holder 30 according to the modification 1 of the second embodiment of the present invention, and is a view corresponding to FIG. 22A in the second embodiment. Further, FIG. 28B is an enlarged perspective view when the thermistor mounting portion 30*c* of the holder 30 according to the modification 1 of the second embodiment of the present invention is viewed from below, and is a view corresponding to FIG. 19B in the second embodiment.

As shown in the drawing, the thermistor 50*c* has a circular columnar-shaped cover member 54 in place of the cover member 52 of the thermistor 50 in the second embodiment. The cover member 54 has a disc-shaped thermistor projecting portion 54a in place of the thermistor projecting portion 52a in the second embodiment. The thermistor mounting portion 30c of the holder 30 has a sensor inserting portion 138 into which the thermistor 50c is inserted in place of the sensor inserting portion 132 of the thermistor mounting portion 30a according to the second embodiment. That is, a circular-shaped opening portion 138a into which the cover member 54 is inserted is formed on the sensor inserting portion 138 in place of the opening portion 132a in the second embodiment. Other configurations are equal to the corresponding configurations of the thermistor 50 in the second embodiment and hence, the description of other configurations is omitted.

As has been described heretofore, the energy storage apparatus according to the modification 1 of the second embodiment of the present invention can also acquire substantially the same advantageous effects as the second embodiment.

(Modification 2)

Next, a modification 2 of the second embodiment is described. In the second embodiment, the holder 30 has the pair of first biasing portions 133 and the pair of upper engaging portions 134. However, in this modification, the holder 30 has only one first biasing portion and one upper engaging portion.

Figure 29:
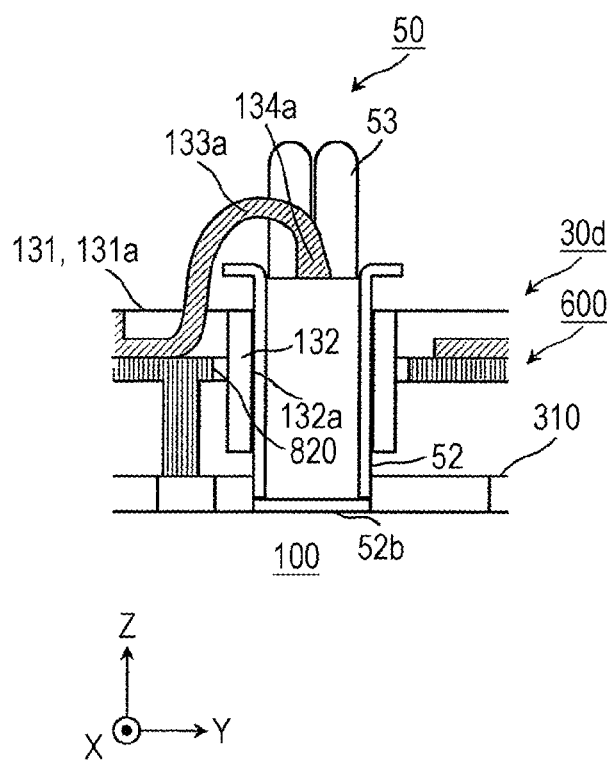
FIG. 29 is a cross-sectional view showing the configuration of a thermistor mounting portion of a holder according to a modification 2 of the second embodiment.

FIG. 29 is a cross-sectional view showing the configuration of a thermistor mounting portion 30d of a holder 30 according to the modification 2 of the second embodiment of the present invention. FIG. 29 is a view which corresponds to FIG. 26A in the second embodiment.

As shown in FIG. 29, the thermistor mounting portion 30d of the holder 30 has one first biasing portion 133a and one upper engaging portion 134a in place of the pair of first biasing portions 133 and the pair of upper engaging portions 134 of the thermistor mounting portion 30a, 30b of the holder 30 in the second embodiment. The upper engaging portion 134a engages with a center portion of an upper surface of the thermistor 50. However, the position where the upper engaging portion 134a engages with the thermistor 50 is not particularly limited. Other configurations are substantially equal to corresponding configurations of the holder 30 in the second embodiment and hence, the description of other configurations is omitted.

As has been described above, the energy storage apparatus according to the modification 2 of the second embodiment of the present invention can also acquire substantially the same advantageous effects as the second embodiment.

Although the energy storage apparatus according to the second embodiment of the present invention and the modifications of the second embodiment have been described heretofore, the present invention is not limited to the second embodiment and the modifications of the second embodiment. That is, it should be construed that the second embodiment and the modifications of the second embodiment disclosed in this specification are described only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention. Further, modes obtained by arbitrarily combining respective constitutional elements which the above-mentioned second embodiment and the modifications of the second embodiment include are also included in the scope of the present invention.

For example, in the second embodiment and the modifications of the second embodiment, the energy storage apparatus includes the thermistor as a sensor, and the thermistor is mounted on the energy storage device 100. However, the energy storage apparatus may include a temperature sensor other than the thermistor such as a platinum temperature measuring resistor. The energy storage apparatus may also include a sensor other than a temperature sensor such as a sensor for detecting a voltage and an electric current. Such a sensor may be mounted on the energy storage device 100 with the same configuration and the same method as the case of mounting the thermistor on the energy storage device 100.

In the second embodiment and the modifications of the second embodiment, the thermistor is disposed in the state where the thermistor is brought into contact with the upper surface of the energy storage device 100. However, the thermistor may be disposed at any portion of the energy storage device 100 provided that the position allows the thermistor to measure a temperature of the energy storage device 100. For example, thermistor may be disposed in a state where the thermistor is brought into contact with the bus bar which is connected to the electrode terminal (the positive electrode terminal 120 and the negative electrode terminal 130) of the energy storage device 100.

In the second embodiment and the modifications of the second embodiment, the holder 30 includes the first biasing portion having the configuration described with reference to FIG. 19A, FIG. 20A, FIG. 29 and the like. However, provided that the first biasing portion has the configuration where the biasing portion biases the thermistor toward the energy storage device 100, the configuration of the first biasing portion is not particularly limited. For example, the first biasing portion may be formed of a resilient member such as a spring or a leaf spring, or may be made of a material having resiliency such as rubber. The same goes for the second biasing portion 821 of the bus bar frame 600.

In the second embodiment and the modifications of the second embodiment, the upper engaging portions 134 of the holder 30 are made to engage with the upper surfaces of the thermistors. However, the upper engaging portions 134 may be made to engage with portions other than the upper surfaces such as side surfaces of the thermistor.

In the second embodiment and the modifications of the second embodiment, the holder 30 has the sensor inserting portion. However, it is sufficient that the holder 30 include the first engaging portions (upper engaging portions) and the first biasing portion. Accordingly, the holder may be configured such that the holder does not include the sensor inserting portion. Further, the holder 30 may be configured such that the holder 30 does not include the second member (the spacer 310, the bus bar frame 600).

In the second embodiment and the modifications of the second embodiment, the holder 30 which holds the bus bars 41, 42, the thermistor and the like as the first member is exemplified. However, the first member is not limited to the holder 30, and it is sufficient that the first member be a member which is disposed in an opposedly facing manner with the energy storage device 100. That is, the first member may be a member which does not have a function of holding the bus bars 41, 42, the thermistor and the like unlike the holder 30. The first member may be also a member which has a function of holding members other than the bus bars 41, 42, the thermistor and the like.

In the second embodiment and the modifications of the second embodiment, the spacer 310 and the bus bar frame 600 are exemplified as the second member. However, any member may be used as the second member provided that such a member is disposed between the energy storage device 100 and the first member and is engageable with the first member.

In the second embodiment and the modifications of the second embodiment, in the method of manufacturing the energy storage apparatus, the thermistor 50 and the holder 30 are mounted on the energy storage device 100 after the thermistor 50 is mounted on the holder 30. However, the thermistor 50 may be mounted on the holder 30 after the holder 30 is mounted on the energy storage device 100.

The present invention can be carried out not only in the form of an energy storage apparatus but also in the form of the holder 30 and the bus bar frame 600 which the energy storage apparatus includes.

The present invention which includes the second embodiment and the modifications is applicable to an energy storage apparatus which includes an energy storage device and sensors mounted on the energy storage device and the like.

What is claimed is:

1. An energy storage apparatus comprising:
a plurality of energy storage devices;
a spacer unit having one or more spacers disposed between the energy storage devices or on sides of the energy storage devices; and
a plurality of members disposed above the energy storage devices and the spacer unit, the plurality of members including at least one of a bus bar frame, a heat shielding plate and a holder,
wherein the spacer unit has a plurality of locking portions, the locking portions being configured to lock the members, respectively.

2. The energy storage apparatus according to claim 1, wherein each of the spacers has the locking portion which is formed of a plurality of locking portions.

3. The energy storage apparatus according to claim 1, wherein the spacer unit includes a first spacer and a second spacer as the spacers,
the plurality of members have a first member and a second member, the first spacer has the locking portion and is configured to lock the first member by the locking portion, and
the second spacer has the locking portion and is configured to lock the second member by the locking portion.

4. The energy storage apparatus according to claim 1, wherein the locking portions are configured to lock the plurality of members in a state where the locking portions support the plurality of members toward the spacer unit.

5. The energy storage apparatus according to claim 1, wherein the plurality of members are stacked in a vertical direction.

6. The energy storage apparatus according to claim 5, wherein the plurality of locking portions are disposed at a same height, and
each of the plurality of members has a portion to be locked disposed at a locking position of the locking portion which corresponds to said each of the plurality of members.

7. The energy storage apparatus according to claim 6, wherein the spacer unit has the plurality of spacers, and the spacers have a same shape.

8. The energy storage apparatus according to claim 1 further comprising a sensor mounted on the energy storage device,
wherein among the plurality of members, one member is the holder which is configured to hold the sensor, and
the sensor is disposed in the vicinity of the locking portion which is configured to lock the holder.

9. The energy storage apparatus according to claim 1, wherein the locking portion, which is configured to lock at least one member among the plurality of members, is configured to lock a center portion of the member.

10. An energy storage apparatus comprising:
an energy storage device;
a sensor mounted on the energy storage device; and
a first member disposed in an opposedly facing manner with the energy storage device,
wherein the first member has:
a first engaging portion disposed as to sandwich the sensor in cooperation with the energy storage device, the first engaging portion being configured to engage with the sensor; and
a first biasing portion which is connected to the first engaging portion and is configured to apply a force on the sensor in a direction toward the energy storage device.

11. The energy storage apparatus according to claim 10, wherein the first engaging portion is configured to engage with an upper surface of the sensor.

12. The energy storage apparatus according to claim 9, wherein the first member further includes a sensor inserting portion in which an opening portion for inserting the sensor is formed.

13. The energy storage apparatus according to claim 12, wherein the energy storage apparatus further comprises a second member disposed between the energy storage device and the first member, and
the sensor inserting portion has a second engaging portion which is disposed between the energy storage device and the second member and is configured to engage with the second member.

14. The energy storage apparatus according to claim 13, wherein the second engaging portion is a projecting portion which is configured to project from a side surface of the sensor inserting portion.

15. The energy storage apparatus according to claim 13, wherein the second member has a second biasing portion which is configured to engage with the second engaging portion, and is configured to apply a force on the second engaging portion in a direction toward the energy storage device.

16. The energy storage apparatus according to claim 13, wherein the second member has two gaps communicating with the opening portion into which the sensor is inserted, the two gaps being formed at engaging positions where an engaging portion, which is configured to engage with the second engaging portion, is sandwiched by said two gaps.

17. An energy storage apparatus comprising:
an energy storage device;
a sensor mounted on the energy storage device;
a first member disposed in an opposedly facing manner with the energy storage device; and
a second member disposed between the energy storage device and the first member,
wherein the sensor is oriented in a direction which intersects with the first member, and the first member comprises:
- a first engaging portion disposed as to sandwich the sensor in cooperation with the energy storage device, the first engaging portion being configured to engage with the sensor; and
- a first biasing portion which is connected to the first engaging portion and is configured to apply a force on the sensor in a direction toward the energy storage device, and the first engaging portion is configured to engage with an upper surface of the sensor.

18. A method of manufacturing an energy storage apparatus which includes an energy storage device and a sensor mounted on the energy storage device, the method comprising:
- disposing a first engaging portion of a first member which is disposed in an opposedly facing manner with the energy storage device at a position where the first engaging portion sandwiches the sensor in cooperation with the energy storage device;
- making the first engaging portion of the first member engage with the sensor; and
- applying a force on the sensor in a direction toward the energy storage device by a first biasing portion of the first member, the first member being connected to the first engaging portion.

19. The energy storage apparatus according to claim 1, wherein the plurality of members comprises the bus bar frame, the heat shielding plate and the holder, which are stacked on the spacer unit and on a terminal surface of the plurality of energy storage devices.

20. The energy storage apparatus according to claim 19, wherein the locking portion comprises a projection which projects in a direction away from the terminal surface,
- wherein a member of the plurality of members comprises one of an other projection and an opening, and
- wherein in a locked state, the projection of the locking portion engages the one of the other projection and the opening of the member to lock a position of the member.

* * * * *